(12) United States Patent
Stephenson

(10) Patent No.: US 9,939,054 B2
(45) Date of Patent: Apr. 10, 2018

(54) ACTUATOR WITH BALL SCREW DRIVE

(71) Applicant: Command Access Technology, Inc., Yorba Linda, CA (US)

(72) Inventor: Jeffrey J. Stephenson, Monrovia, CA (US)

(73) Assignee: Command Access Technology, Inc., Yorba Linda, CA (US)

( * ) Notice: Subject to any disclaimer, the term of this patent is extended or adjusted under 35 U.S.C. 154(b) by 236 days.

(21) Appl. No.: 14/879,937

(22) Filed: Oct. 9, 2015

(65) Prior Publication Data

US 2017/0102058 A1     Apr. 13, 2017

(51) Int. Cl.
*F16H 21/44*     (2006.01)
*F16H 25/22*     (2006.01)
*E05B 47/00*     (2006.01)

(52) U.S. Cl.
CPC ..... *F16H 25/2228* (2013.01); *E05B 47/0012* (2013.01); *F16H 25/2214* (2013.01)

(58) Field of Classification Search
CPC ............. F16H 25/2228; F16H 25/2214; F05B 47/0012; E05F 3/22; E05F 1/08
See application file for complete search history.

(56) References Cited

U.S. PATENT DOCUMENTS

| | | |
|---|---|---|
| 3,476,430 A | 11/1969 | Widmer |
| 3,854,763 A * | 12/1974 | Zawadzki ........... E05B 47/0002 292/201 |
| 3,954,016 A | 5/1976 | Sarosy et al. |
| 4,083,590 A * | 4/1978 | Folger ................. E05B 65/1053 292/168 |
| 4,463,787 A * | 8/1984 | Lenertz ..................... B27L 7/00 144/193.1 |
| 4,920,876 A * | 5/1990 | Cruse ........................ B30B 1/18 100/289 |

(Continued)

FOREIGN PATENT DOCUMENTS

WO     WO 2011013744 A1     2/2011

OTHER PUBLICATIONS

NTN Global, New Products News, "Hollow Ball Screw Unit," [Thin and lightweight contributing to more compact and efficient electronically controlled CVT], downloaded Aug. 2, 2016, http://www.ntnglobal.com/en/news/new_products/news201300021.html.

*Primary Examiner* — Zakaria Elahmadi
(74) *Attorney, Agent, or Firm* — Larry K. Roberts

(57) ABSTRACT

An embodiment is an electromechanical door latch system including a latch device configured for motion between a latched position and an unlatched position. A manually actuated mechanical apparatus is coupled to the latch device and configured to move the latch device to the unlatched position in response to force applied by a user to a component of the mechanical apparatus. An electromechanical actuator system moves the latch device to an actuator unlatched position in response to an electrical signal from an access control device. The electromechanical actuator system includes a control module, a motor, and a ball screw drive including a ball screw or threaded nut, with one coupled to the motor shaft and the other configured for connection to a latch mechanism, and at least one recirculating ball circuit including ball bearings for transferring torque from the motor to the ball screw drive.

16 Claims, 22 Drawing Sheets

(56) References Cited

U.S. PATENT DOCUMENTS

| | | | | |
|---|---|---|---|---|
| 5,041,748 A * | 8/1991 | Huber | ................ | F16H 25/2204 |
| | | | | 192/141 |
| 5,085,475 A * | 2/1992 | Austin | ................ | E05B 65/1093 |
| | | | | 292/144 |
| 5,169,185 A * | 12/1992 | Slaybaugh | .......... | E05B 65/1053 |
| | | | | 292/21 |
| 5,340,171 A * | 8/1994 | Slaybuagh | ............ | E05B 47/023 |
| | | | | 292/201 |
| 5,644,869 A | 7/1997 | Buchanan, Jr. | | |
| 5,687,507 A * | 11/1997 | Beran | ...................... | E05F 15/70 |
| | | | | 49/339 |
| 5,826,823 A | 10/1998 | Lymons et al. | | |
| 5,913,763 A * | 6/1999 | Beran | ..................... | E05F 15/70 |
| | | | | 49/26 |
| 5,988,708 A | 11/1999 | Frolov et al. | | |
| 6,189,939 B1 * | 2/2001 | Zehrung | ............ | E05B 65/1053 |
| | | | | 292/21 |
| 6,223,469 B1 * | 5/2001 | Moll | ..................... | E05F 15/611 |
| | | | | 49/339 |
| 6,386,597 B1 * | 5/2002 | Walsh, III | .......... | E05B 65/1053 |
| | | | | 292/201 |
| 6,396,414 B1 * | 5/2002 | Bickford | ................ | H01B 7/065 |
| | | | | 174/47 |
| 6,565,130 B1 * | 5/2003 | Walsh, III | .......... | E05B 47/0002 |
| | | | | 292/201 |
| 7,464,627 B2 * | 12/2008 | Ko | ........................ | E05B 15/004 |
| | | | | 185/39 |
| 7,536,885 B1 * | 5/2009 | Ross | ................... | E05B 65/1073 |
| | | | | 292/251.5 |
| 7,862,091 B2 | 1/2011 | Escobar | | |
| 7,883,123 B2 * | 2/2011 | Condo | ................ | E05B 65/1053 |
| | | | | 292/92 |
| 8,495,836 B2 * | 7/2013 | Lowder | ............... | E05B 65/1053 |
| | | | | 292/92 |
| 8,851,530 B2 * | 10/2014 | Geringer | ............. | E05B 47/0012 |
| | | | | 292/144 |
| 8,978,305 B2 * | 3/2015 | Morstatt | ............... | E05B 47/026 |
| | | | | 292/144 |
| 2001/0029797 A1 * | 10/2001 | Lange | ................. | F16H 25/2015 |
| | | | | 74/89.37 |
| 2002/0194785 A1 * | 12/2002 | Stojc | ....................... | E05B 77/00 |
| | | | | 49/118 |
| 2003/0097794 A1 * | 5/2003 | Brennwald | ............. | E05F 1/105 |
| | | | | 49/336 |
| 2005/0104381 A1 * | 5/2005 | Whitaker | ............... | E05B 65/108 |
| | | | | 292/190 |
| 2006/0082162 A1 * | 4/2006 | Escobar | ................ | E05B 47/023 |
| | | | | 292/144 |
| 2007/0261310 A1 * | 11/2007 | Porat | ..................... | E05F 1/1091 |
| | | | | 49/340 |
| 2008/0295550 A1 * | 12/2008 | Schmidt | ................. | E05B 65/10 |
| | | | | 70/144 |
| 2010/0045053 A1 * | 2/2010 | Dye | ..................... | E05B 47/0012 |
| | | | | 292/201 |
| 2010/0050524 A1 * | 3/2010 | Helms | ................... | E05F 15/622 |
| | | | | 49/26 |
| 2015/0184426 A1 * | 7/2015 | Arlinghaus | ......... | E06B 65/1053 |
| | | | | 292/138 |
| 2016/0010731 A1 * | 1/2016 | Stensgaard | ............. | F16D 28/00 |
| | | | | 74/89.35 |
| 2016/0023609 A1 * | 1/2016 | Watson | ..................... | B60R 3/02 |
| | | | | 280/166 |
| 2017/0009505 A1 * | 1/2017 | Adoline | .................. | E05D 3/022 |

* cited by examiner

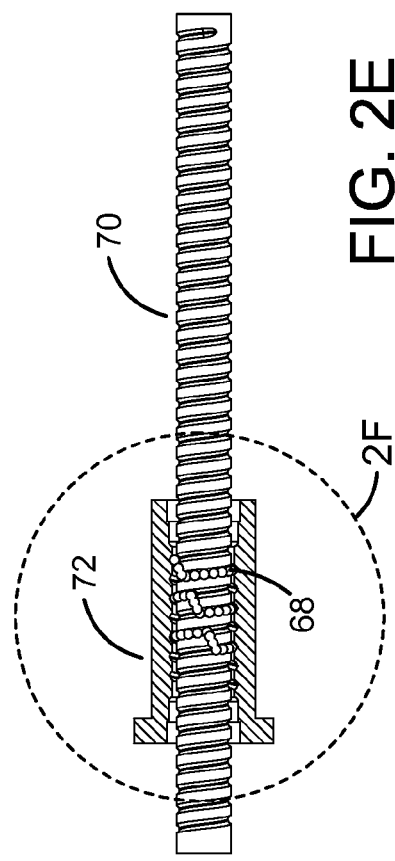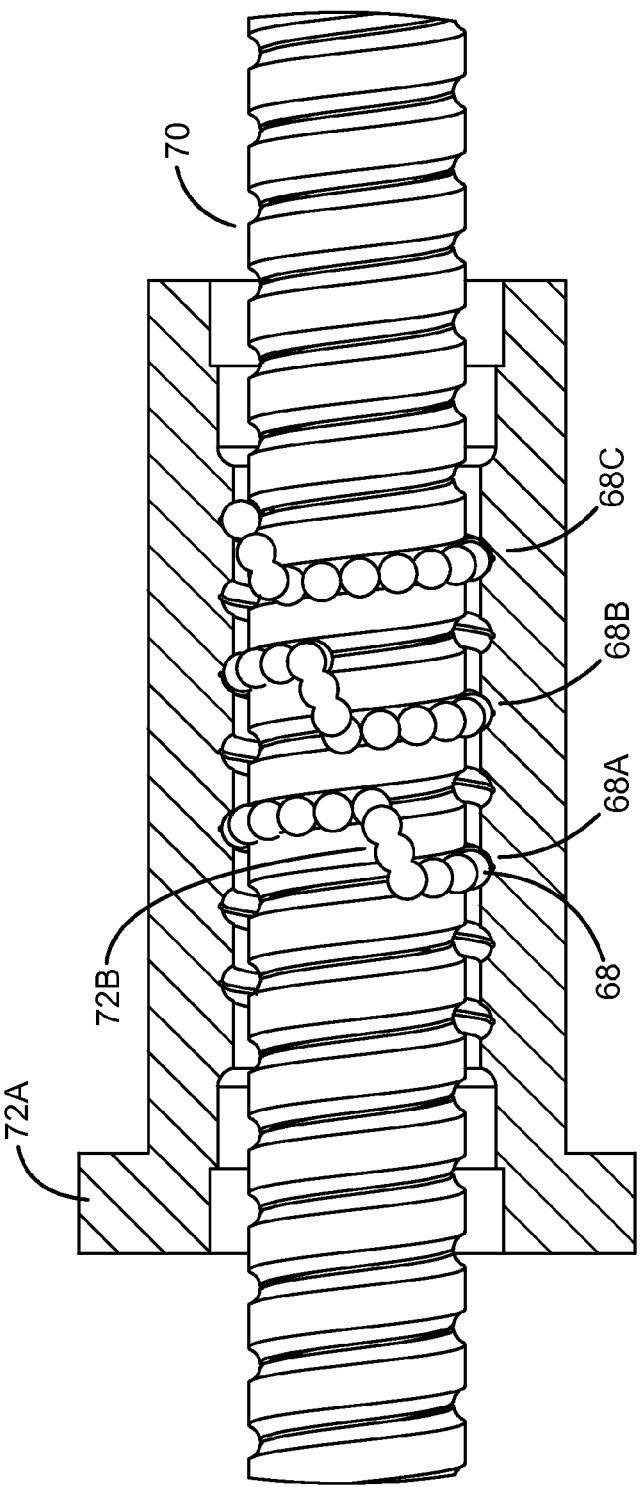

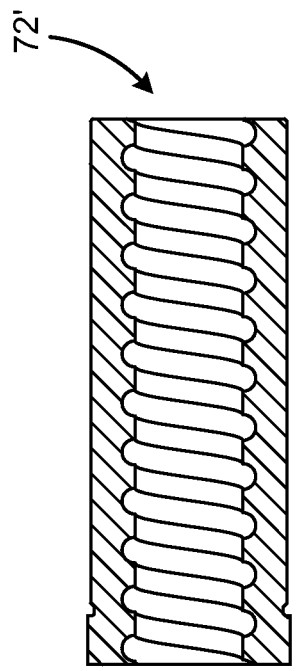
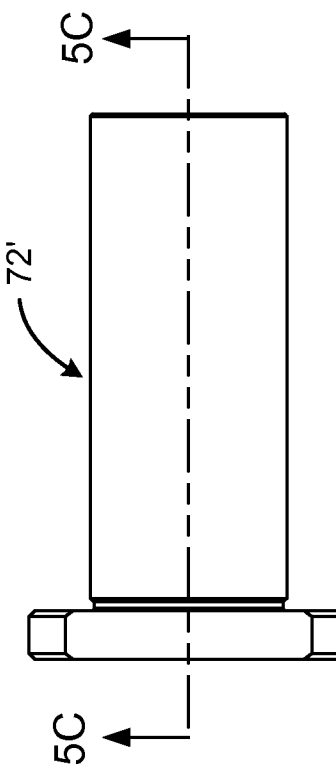
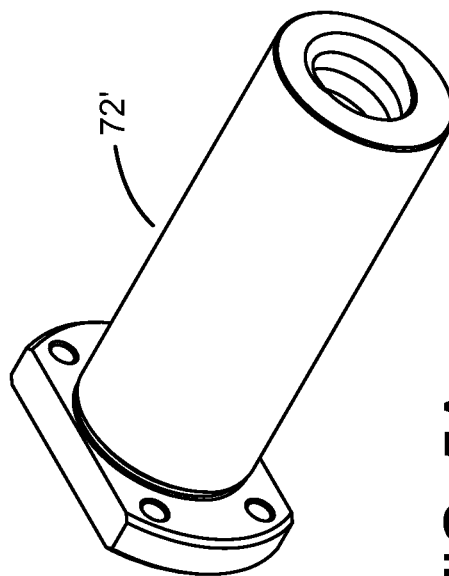
FIG. 5C
FIG. 5B
FIG. 5A

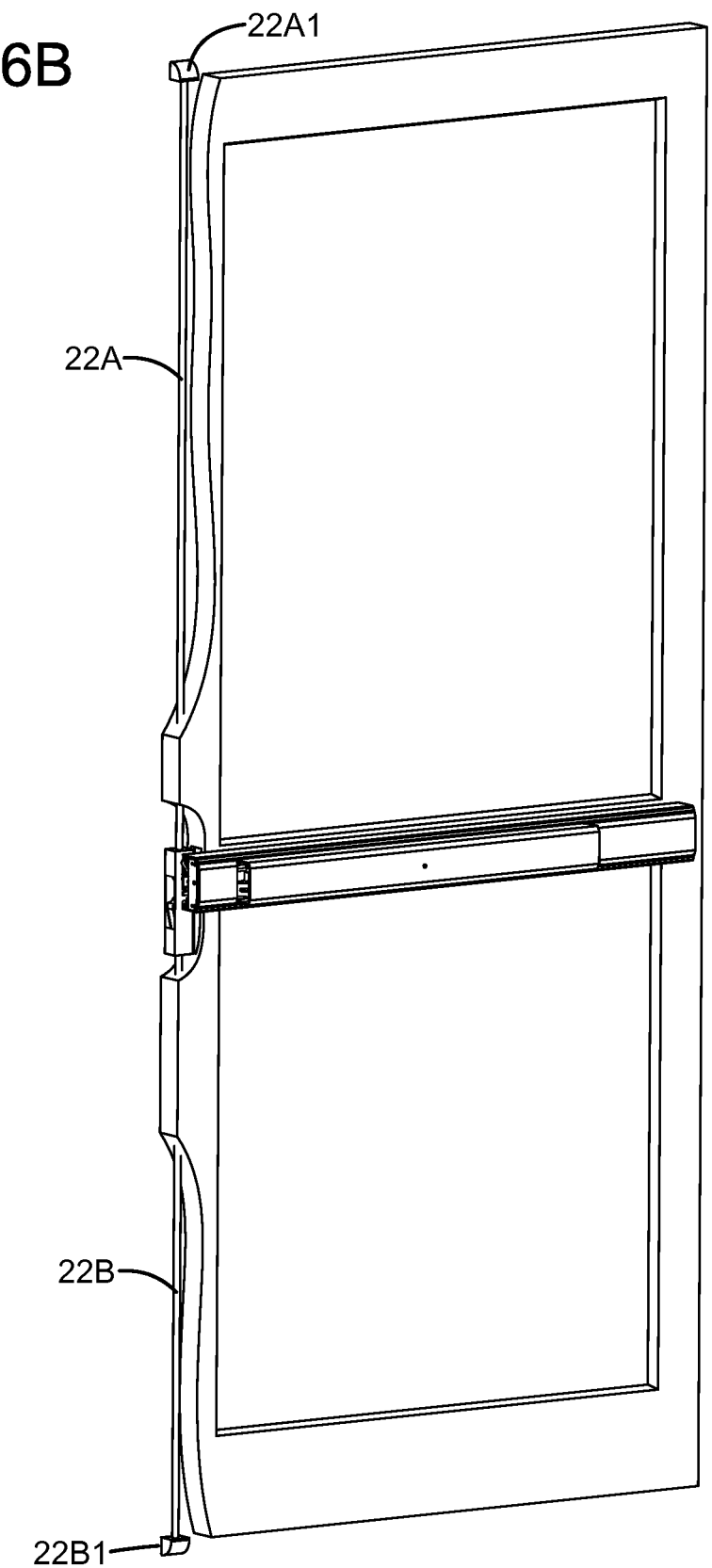

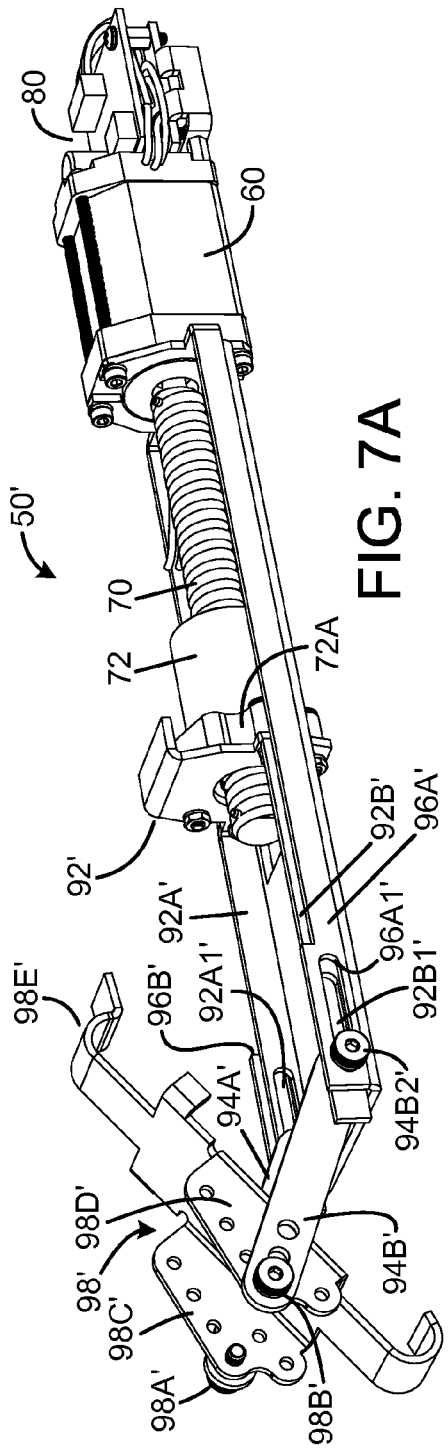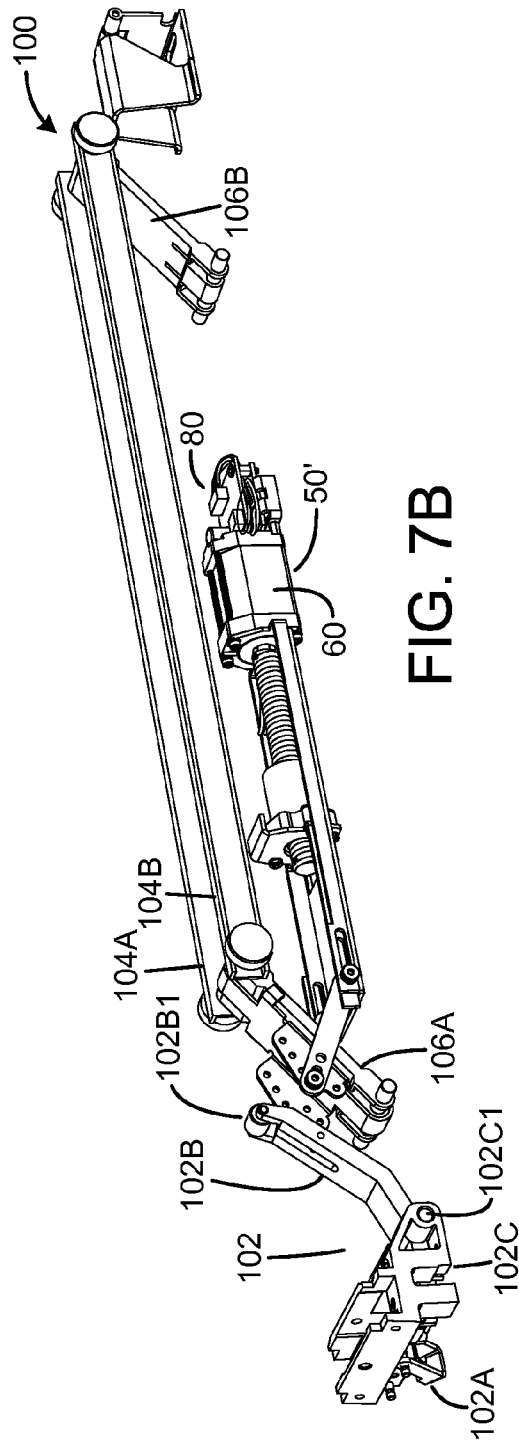

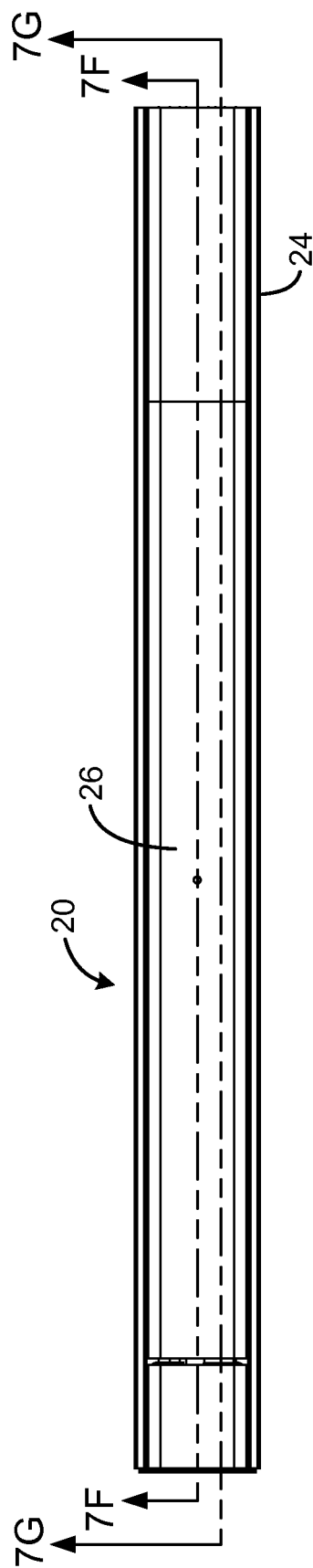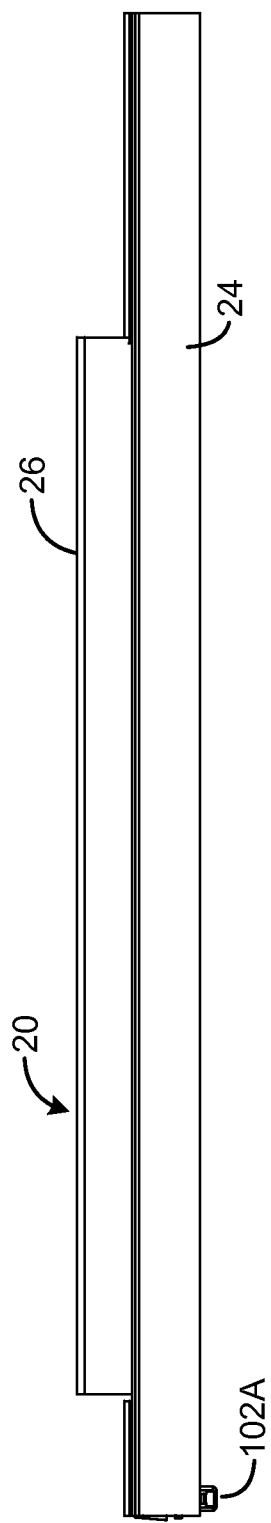
FIG. 7E
FIG. 7D

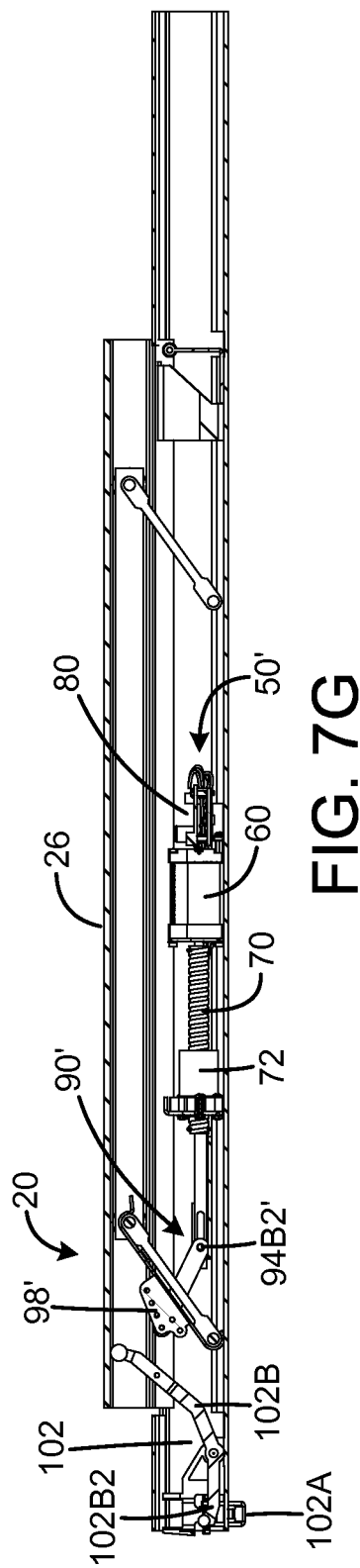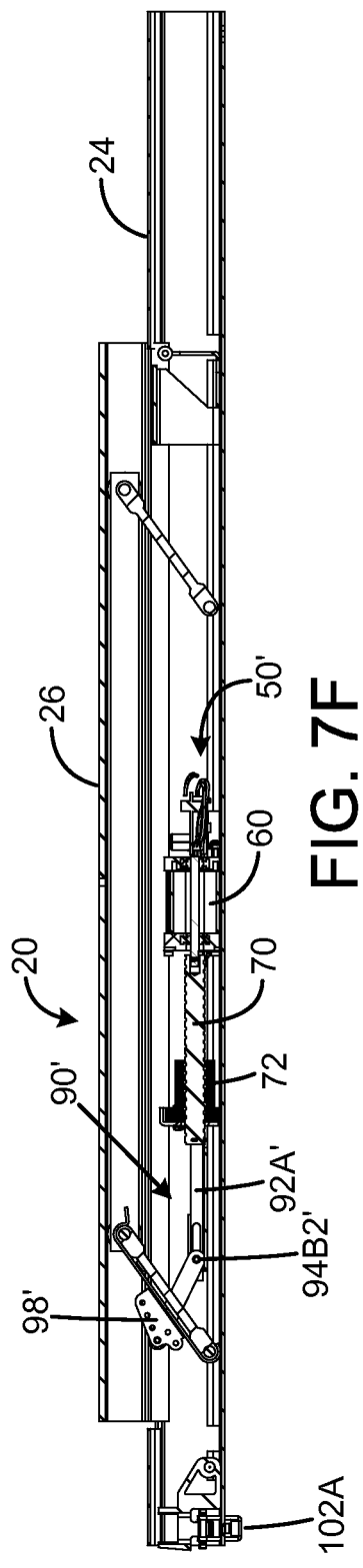

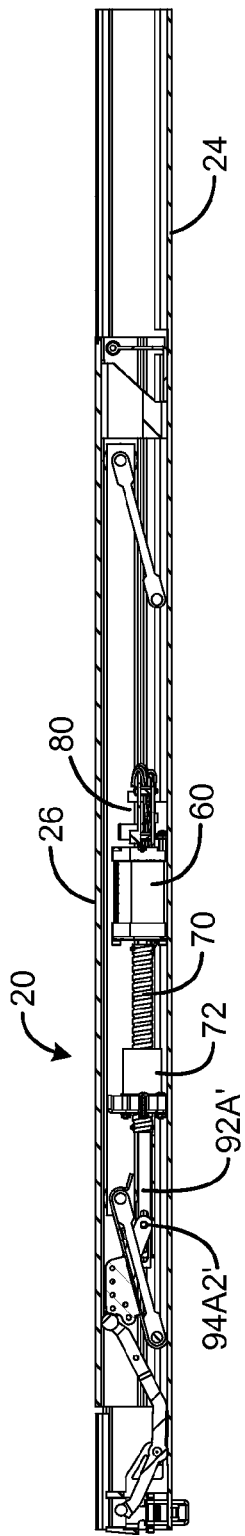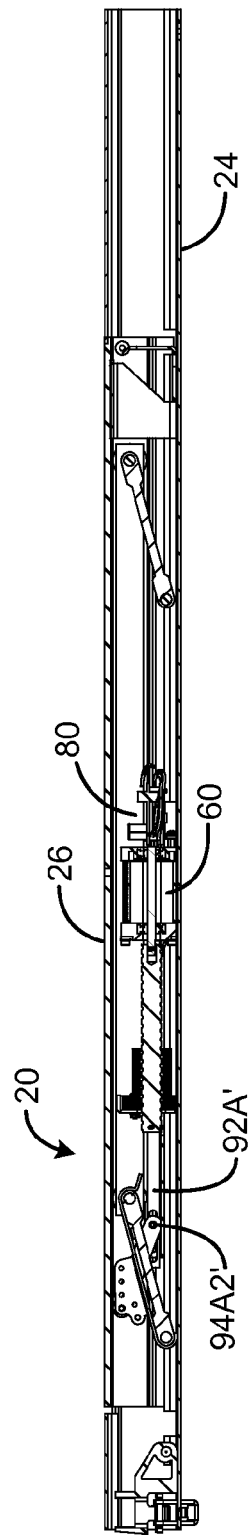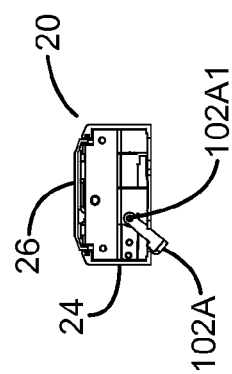

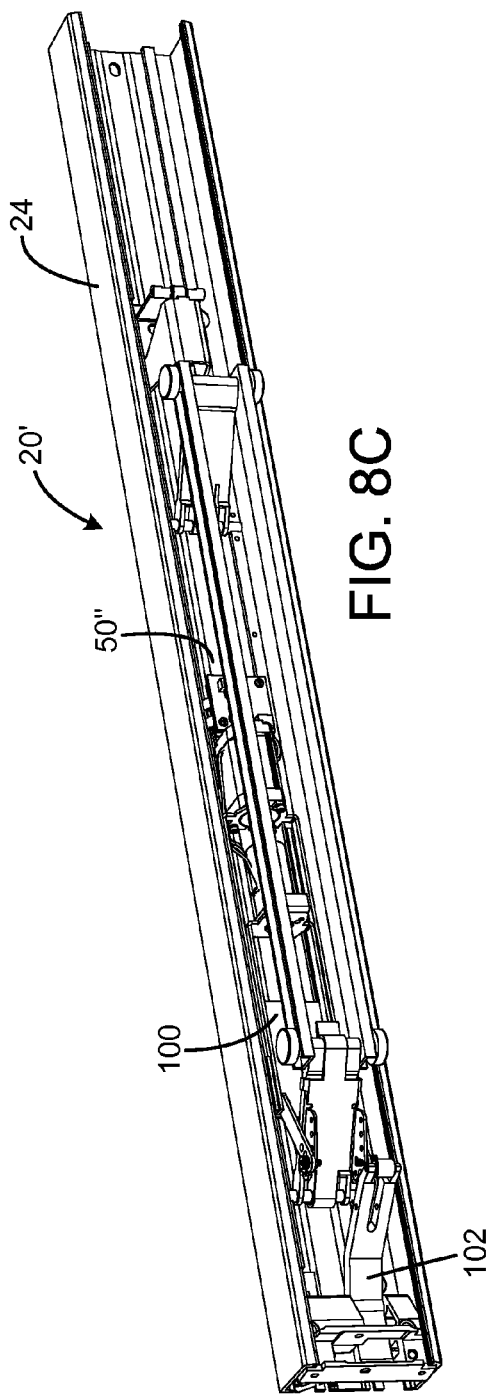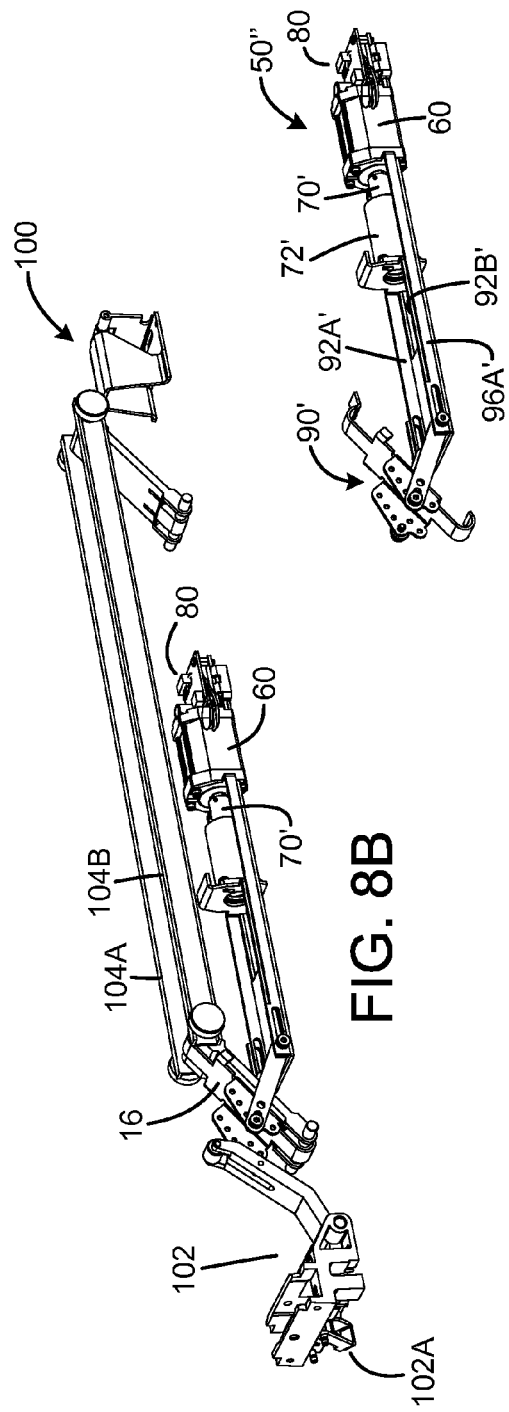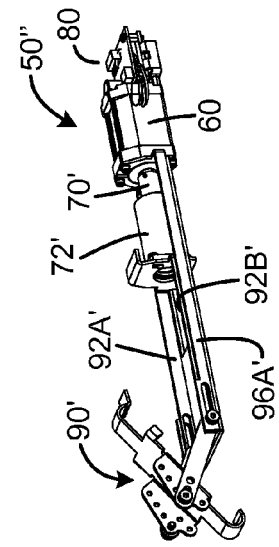

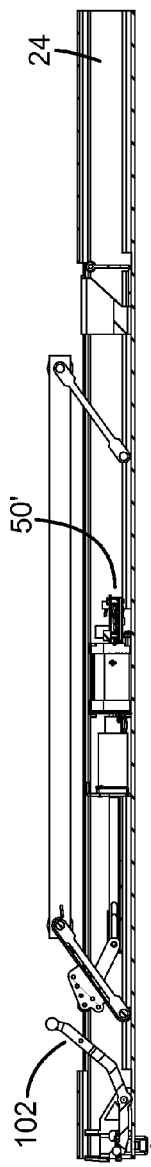 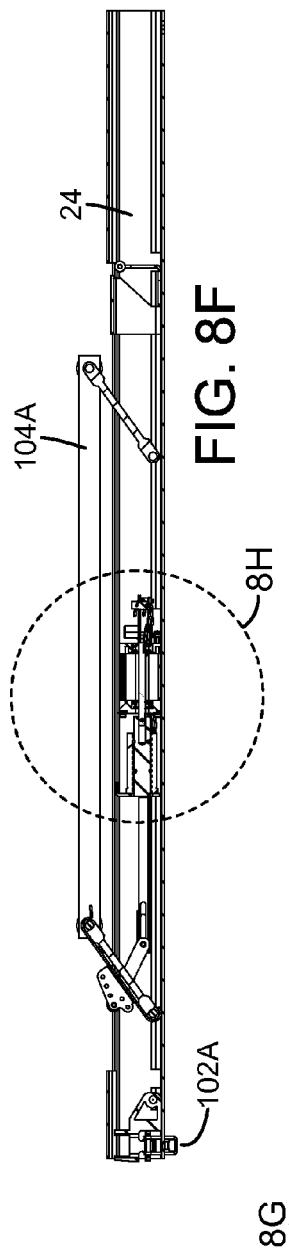 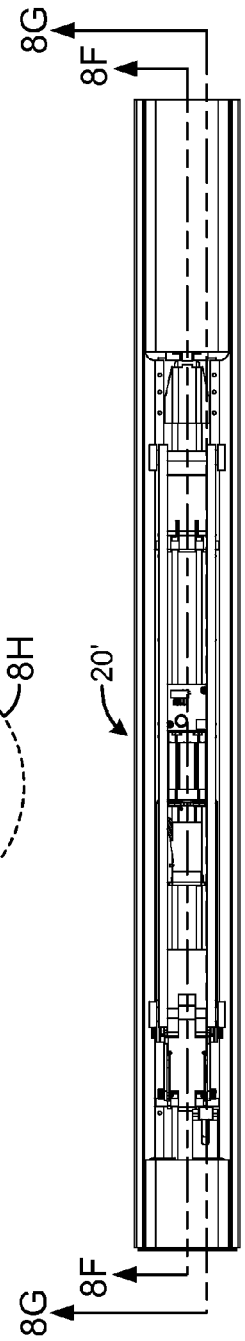 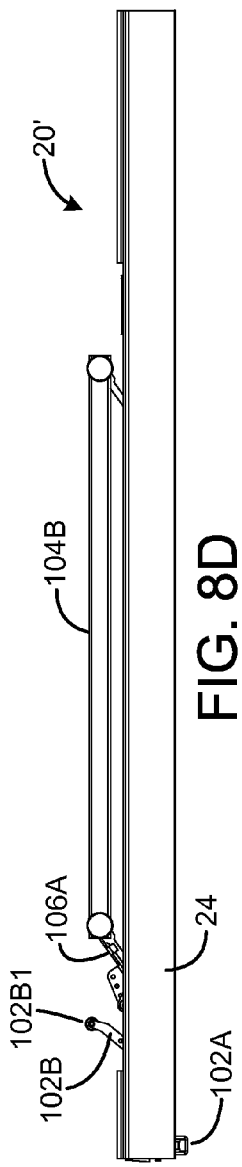

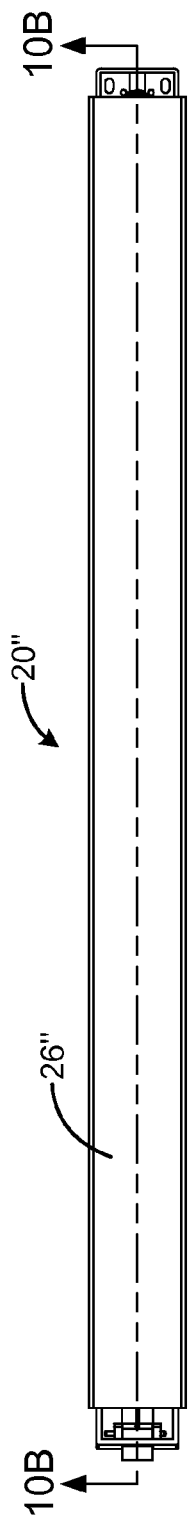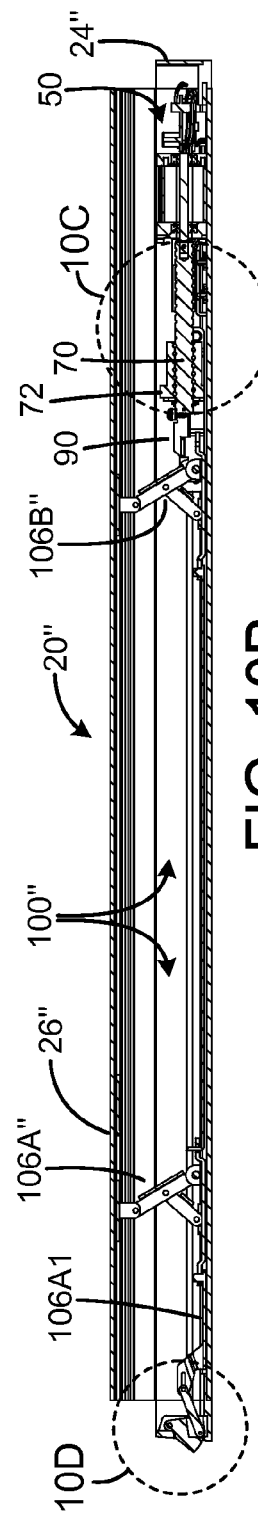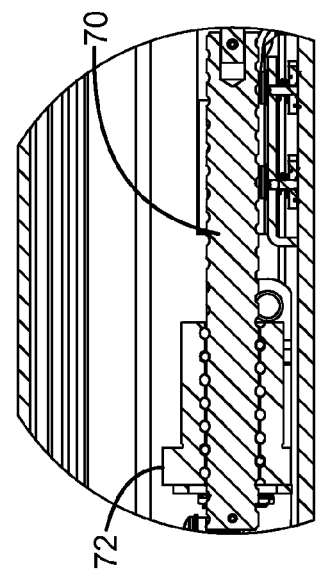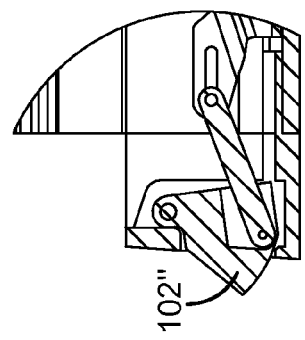
FIG. 10A
FIG. 10B
FIG. 10C
FIG. 10D

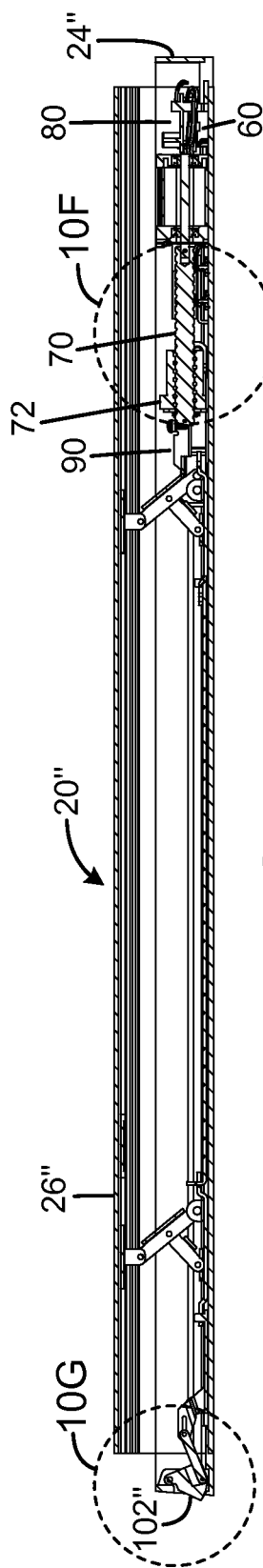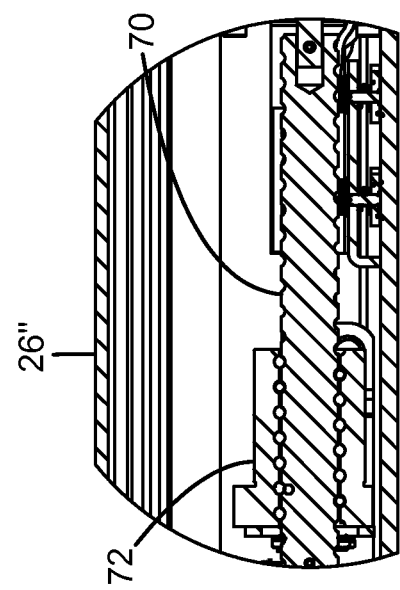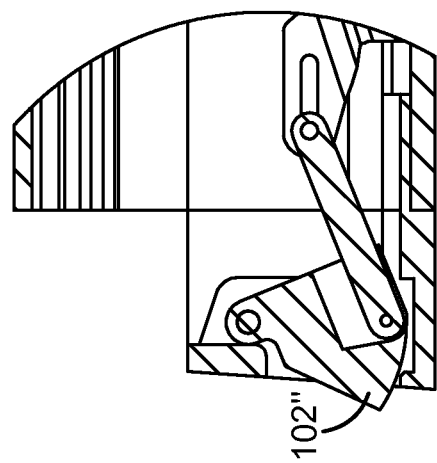

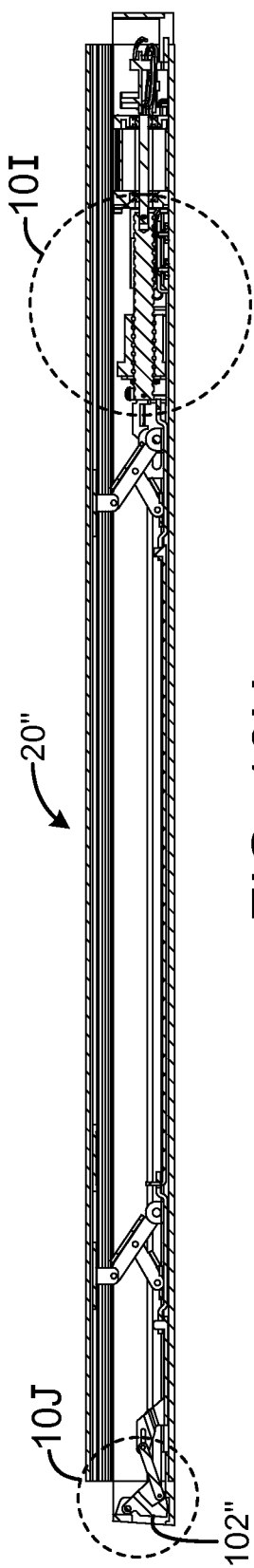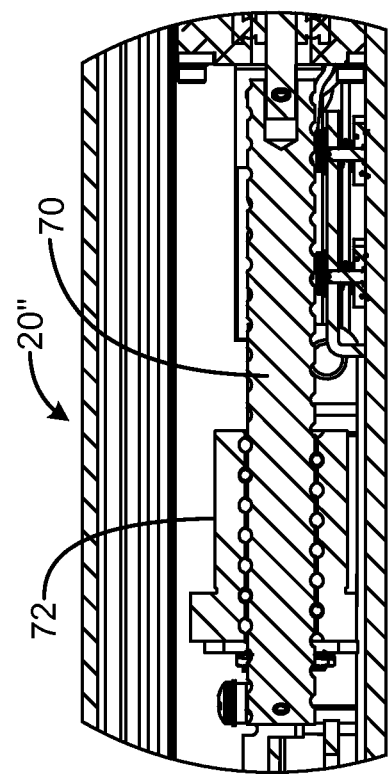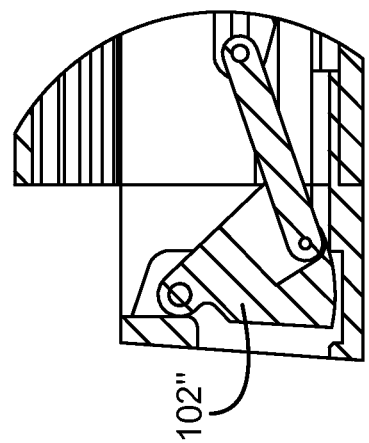

ACTUATOR WITH BALL SCREW DRIVE

BACKGROUND

Push bar exit devices are mounted on the egress side of the door. They can be mounted for rim, mortise, surface vertical rods, or concealed vertical rods applications. Push bar exit devices feature an enclosed mechanism case with a push bar area to allow egress. Some electrified latch pullback mechanisms for exit devices allows for remote keyless access control where exit devices are used or required. Common applications include conditions such as hospitals, airports, schools, churches and they are commonly specified in applications that require automatic door openers. The device may be continuously energized allowing for a push/pull condition if desired.

Electrified latch pullback modifications are a common product within the industry. They are typically solenoid or motor driven devices. Motor driven devices are usually coupled to an acme style threaded leadscrew combination to translate the rotational output force of the motor to the linear force most commonly required to actuate the latch of an exit device. Because of the high contact area required in this type of leadscrew, the friction losses are generally very high. Because of these losses, larger motors and/or finer thread pitches are required to create the linear force requirements for the specific application.

However, larger motors and/or finer pitches cannot always satisfy the requirements for each exit device. Size limitations may prevent larger motors from fitting within the enclosed mechanism case. Finer thread pitches create several other problems. First, the finer pitch often results in a slower actuation time. More problematic however, is the requirement for the springs within the device to return the leadscrew to the starting point for "fail-safe" operation.

Fail-safe operation within an exit device requires that a non-energized device return to a locked or latched state. Power is generally applied to the device to unlock the latch. Because of the fail-safe requirement, driving the motor in reverse to lock the latch would not be possible. Thus springs must be used to store mechanical energy during latch retraction, then when released, to force the lead screw back to the starting position once power is removed. Adding these springs to a device then requires more power output from the motor, requiring a larger motor. Motors, and more particularly, stepper motors, have an inherent magnetic and mechanical friction observed when rotating the motor shaft in a non-powered state. This friction force increases as the motor size increases. All of these required forces must be balanced for a system to work correctly.

The drive forces of the acme, or a similar style lead screw, is further complicated by the fact that the friction loss characteristics are different when the screw is "back-driven". Normally, lead screws are used to convert rotary motion into linear motion. Back driving is the result of the load pushing axially on the screw or nut to create rotary motion, this in turn, rotating the motor. As a thread pitch is made finer, the friction losses increase, nearly exponentially, to the point that the screw can no longer be back driven. This is known as self-locking. As this relates to the previously mentioned springs used for fail-safe return, only a small range of very coarse thread lead screws can be used. Courser thread pitches require more power from a larger motor. All of these constraints often lead to an impossibility of driving an exit device with a motor and lead screw within the existing specified enclosure constraints.

BRIEF DESCRIPTION OF THE DRAWINGS

Features and advantages of the disclosure will readily be appreciated by persons skilled in the art from the following detailed description when read in conjunction with the drawing wherein:

FIG. 2E is a side, partially broken-away view of an exemplary embodiment of the ball screw and nut of the actuator system of FIG. 1. FIG. 2F is an enlarged view of the broken-away representation of the nut and a portion of the ball screw of FIG. 2E.

FIG. 5A is an isometric view depicting the nut of FIG. 3A in isolation. FIG. 5B is a side view of the nut of FIG. 5A. FIG. 5C is a cross-sectional view taken along line 5C-5C of FIG. 5B.

FIGS. 6A-6B illustrate an exemplary embodiment of an electromechanical door latch system, mounted to a door.

FIGS. 7A-7J illustrate an exemplary door latch system employing an actuator system in accordance with aspects of the invention. FIG. 7A is an isometric view illustrating the actuator system. FIG. 7B is an isometric view showing the actuator system with features of the door latch system. FIG. 7C is an isometric view showing the door latch system with the push pad and cover removed. FIG. 7E is a front view (from the point of view of the system mounted to a door) of the door latch system. FIG. 7D is a bottom view, from the same point of view, of the door latch system of FIG. 7E. FIGS. 7F and 7G are cross-sectional views taken along respective lines 7F-7F and 7G-7G of FIG. 7E, with the push pad in the fully extended, rest position, with the latch in the latched position. FIGS. 7H and 7I are cross-sectional views similar to respective FIGS. 7F and 7G, but with the push pad in the fully depressed position, to move the latch to the unlatched position. FIG. 7J is an end view of the door latching system with push pad as shown in FIGS. 7H and 7I.

FIGS. 8A-8G illustrate an exemplary door latch system like that described with respect to FIGS. 7A-7J, employing an alternate form of an actuator system. FIGS. 8A-8C are similar to FIGS. 7A-7C. FIG. 8D is a bottom view (from the point of view of the system installed on a door) with the push pad removed. FIG. 8E is a front view of the system. FIGS. 8F and 8G are cross-sectional views taken along lines 8F-8F and 8G-8G of FIG. 8E.

FIG. 9A is a front view of the door latch system. FIG. 9B is a cross-section view taken along line 9B-9B of FIG. 9A.

FIGS. 10A-10J illustrate yet another exemplary door latch system employing an actuation system in accordance with aspects of the invention. FIG. 10A is a front view of the system, taken from the point of view of the system as installed on a door. FIG. 10B is a cross-sectional view taken along line 10B-10B of FIG. 10A. FIG. 10C is an enlarged view of the portion enclosed in phantom circle 10C of FIG. 10B. FIG. 10D is an enlarged view of the portion enclosed within phantom circle 10D of FIG. 10B. FIG. 10E is a view similar to FIG. 10B, but with the electromagnetic actuator system partially retracting the latch bolt. FIG. 10F is an enlargement of the portion within phantom circle 10F of FIG. 10E. FIG. 10G is an enlargement of the portion within phantom circle 10G of FIG. 10E. FIG. 10H is a view similar to FIG. 10B, but with the electromagnetic actuator system fully retracting the latch bolt. FIG. 10I is an enlargement of the portion within phantom circle 10I of FIG. 10H. FIG. 10J is an enlargement of the portion within phantom circle 10J of FIG. 10H.

DETAILED DESCRIPTION

Figure 1:
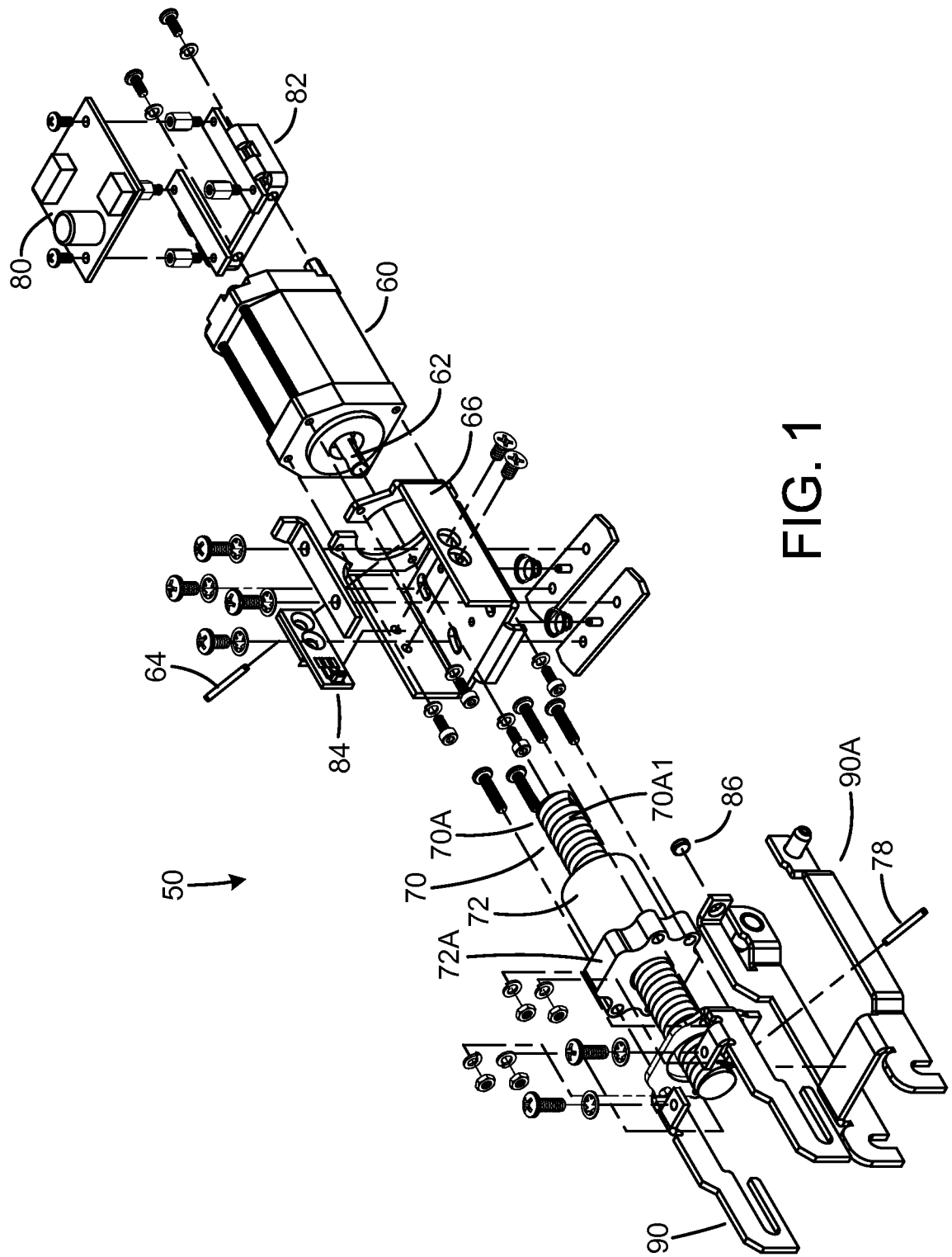
FIG. 1 is an exploded isometric view of an exemplary embodiment of an actuator system with a ball screw drive.

In the following detailed description and in the several figures of the drawing, like elements are identified with like reference numerals. The figures are not to scale, and relative feature sizes may be exaggerated for illustrative purposes.

One exemplary aspect of the invention is an electrified latch pullback system for new and retrofit applications. The system allows for centrally located power supplies and trouble free operation during "continuously on" conditions. The system may be provided as a modification kit for an existing exit device, or as part of an exit device.

An exemplary embodiment provides an actuator using a ball screw or ball drive for converting the rotational force of a motor 60 into a linear force. With a ball screw, bearing balls are used in-between the screw and nut threads to provide a rolling transfer of the power between the two parts, significantly reducing the friction losses. Further, the frictional loses associated with back-driving a ball screw (compared to those associated with back-driving an acme screw) are proportionally increased, versus exponentially increased for an acme screw. For example, if the ball screw pitch is doubled, the frictional loses are approximately doubled. However, for an acme style lead screw, doubling the pitch could quadruple frictional loses, or even be resistant to back-driving. These inherent qualities allow for a smaller motor to be used, allowing the electrified latch pullback systems to fit into more devices and/or allowing for lower power consumption. The use of a ball screw will also allow for reduced support features within the system. Although ball screws are generally specified to not be used with side loading or torsional loads, the mechanical make-up of the ball screw allows their use within the latch pullback systems. The connecting components are relatively very light weight compared to the strength characteristics normally associated with balls screws. Using an oversized ball screw increases the effectiveness of this normally unused phenomenon. This, in turn, allows for systems to use the ball screw like a linear bearing. This support reduces the number of supporting components, reducing costs and complexity of the systems.

In accordance with a further aspect, a new ball drive system allows for the ball drive assembly to be produced with fewer parts. Ball screws require a path for the ball bearings to recirculate from the exit of the ball nut, back to the beginning. Traditional ball screws accomplish this by forcing the ball bearings off and away from the ball screw, either into a tube where they are directed from the end of the path, back to the beginning, or by creating a cavity in the nut housing where the balls can be forced to "jump" from the groove of the thread to the adjacent thread groove. In the former example, any number of rows, or revolutions, of balls allow for the transfer of force with the tube entrance and exit located at the far ends of the circuit. In the latter, only one row or revolution of, or fraction of, balls can be engaged per circuit, with multiple circuits (generally 2 or 3) in place to allow for the strength and rigidity of the required forces. Each of the conventional designs results in higher manufacturing costs compared to acme or similar lead screws. The tube transfer method includes increased costs associated with the tube manufacturing and tube mounting methods and additional machining onto the nut body. The cavity transfer method includes increased costs because of the additional parts usually inserted to form the cavity, or highly sophisticated and uncommon machining methods for creating the cavity within the nut housing through the axial exits of the nut body.

A new ball drive eliminates the need for such additional parts (beyond the nut, screw, and bearing balls). In an embodiment, the ball screw includes an unthreaded shaft, in which a special groove is formed for each ball circuit. The ball screw shaft still includes a path for the bearing balls to recirculate back to the beginning of each circuit, but accomplishes this by forcing the ball bearings off and away from the ball nut, by creating a cavity within the screw, whereas the balls can be forced to "jump" from the groove of the nut thread to the adjacent thread groove. One row or revolution of, or fraction of, balls can be engaged per circuit, with multiple circuits (generally 2 or 3) in place to provide the needed torque. In addition to a reducing the number of parts, this new ball drive allows for more commonplace machining practices to be implemented, with simpler machining paths.

It is noted that ball screw drives in accordance with this aspect may not be appropriate for many ball screw applications. Beyond a certain point in travel, the balls would fall out of the assembly. Most ball screw applications require the path of travel to be significantly longer than the length of the ball nut. In the new ball drive, the travel is shorter than the nut length.

It is contemplated that both conventional ball screw systems and the new ball drive system may be used in door exit devices and exit device kits, and may be used in other device types including, but not limited to mortise locks, exit trim, and cylindrical locks.

In accordance with a further aspect, the motorized ball drive systems may be used with a calibration system as described in commonly owned U.S. application Ser. No. 14/664,513, the entire contents of which are incorporated herein by this reference (the "'513 application"). In addition, specific and unique electronic and programming methods may be used to control the drive motor. These techniques include:

Ramping up motor speed/motor torque to improve the actuation times and/or reduce power consumption.

Pulse-width-modulation of motor control signals for greater speed vs. power control and to improve the actuation times and/or reduce power consumption.

An exemplary embodiment of an actuator system 50 is illustrated in FIGS. 1A-2F. The system 50 provides an actuator using a ball screw drive for converting the rotational force of a motor 60 into a linear force. The motor drives a motor shaft 62, under control of a motor controller module 80. A threaded ball screw 70 is formed with an axial bore formed in a motor connection end 70A, into which the motor shaft 72 is fitted. A pin 64 is passed through transverse bore 70A1 in the motor connection end of the screw 70, and through a corresponding bore formed in the motor shaft, to secure the ball screw 70 to the motor shaft.

The motor 60 is attached to motor mount 66 by threaded fasteners. The mount 66 may be attached to a plate of a door opener mechanism on a door.

The ball screw drive further includes a ball nut 72, and ball bearings 68 (FIGS. 2E-2F). In this embodiment, there are three circuits 68A, 68B, 68C of ball bearings. The screw 70 and the nut 72 are both threaded, and sized to form ball races between the threads. The nut 72 includes cavities 72B to force the ball bearings in each circuit to jump from one thread to the adjacent thread, so as to recirculate the ball bearings as the screw 70 is turned by the motor. Other types of ball screw drives may alternately be employed, such as those including external recirculation tubes to carry the ball bearings. As depicted schematically in FIG. 2F, as the screw is turned by the motor, the ball bearings transfer torque to the nut 72 to advance or retract the nut along the screw axis. There is a full complement of ball bearings filling the respective circuits. In an exemplary embodiment, the ball screw drive is sufficiently oversized, relative to the amount of torque required for the application, so that the ball screw drive is free of support bearings to support the ball screw.

The nut 72 is connected to a ball nut linkage 90, which in turn connects to a door latch mechanism, for example. Thus, by the motor turning the ball screw 70, the nut 72 will actuate the door latch mechanism through the linkage 90. A pin 78 is passed through the distal end of the ball screw to act as a stop against nut travel. In this embodiment, a push pad linkage 90A is also provided, and will move with the push pad of a door actuator system, independently of linkage 90.

The form of the linkages 90 and 90A will depend on the particular type of door latch mechanism in which the system 50 is installed. Other specific forms of the linkage may be employed, to adapt to particular types of door latch mechanisms.

While the ball screw drive illustrated in FIG. 1 employs a threaded nut constrained from rotation, and a rotating ball screw coupled to the motor, in other embodiments, the roles may be reversed. The ball screw may be constrained from rotation and coupled to the linkages 90 and 90A, while the threaded nut is connected to the motor shaft and rotated by the motor.

Figure 2A:
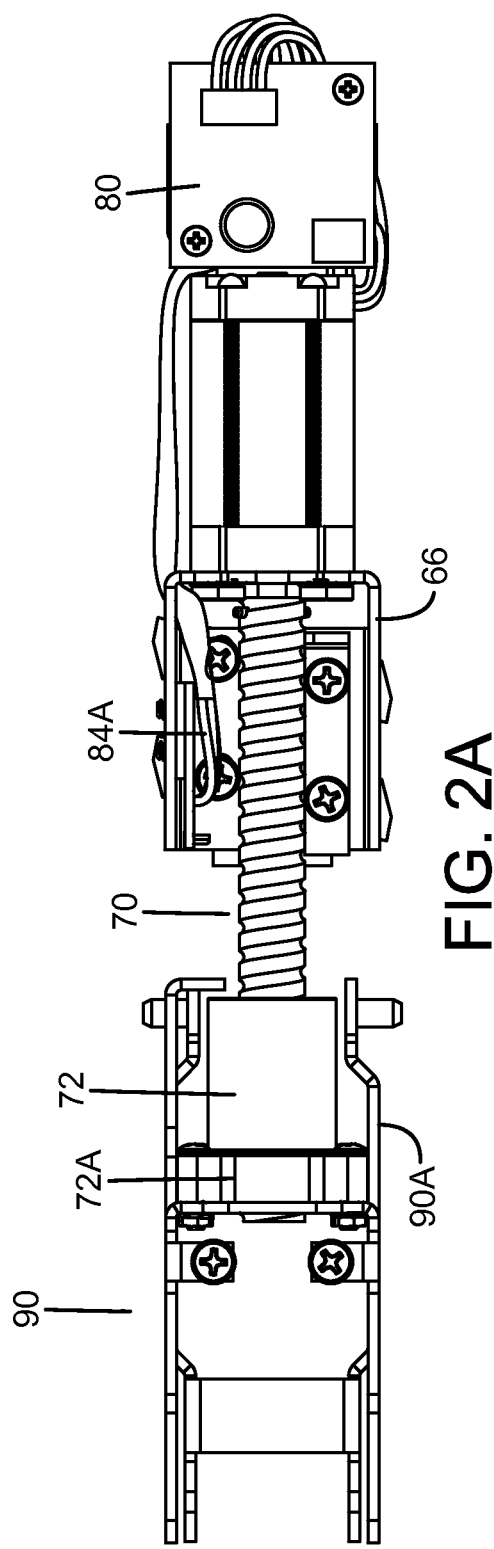
FIGS. 2A-2D are respective top, side, back and front views of the actuator system of FIG. 1.
Figure 2B:
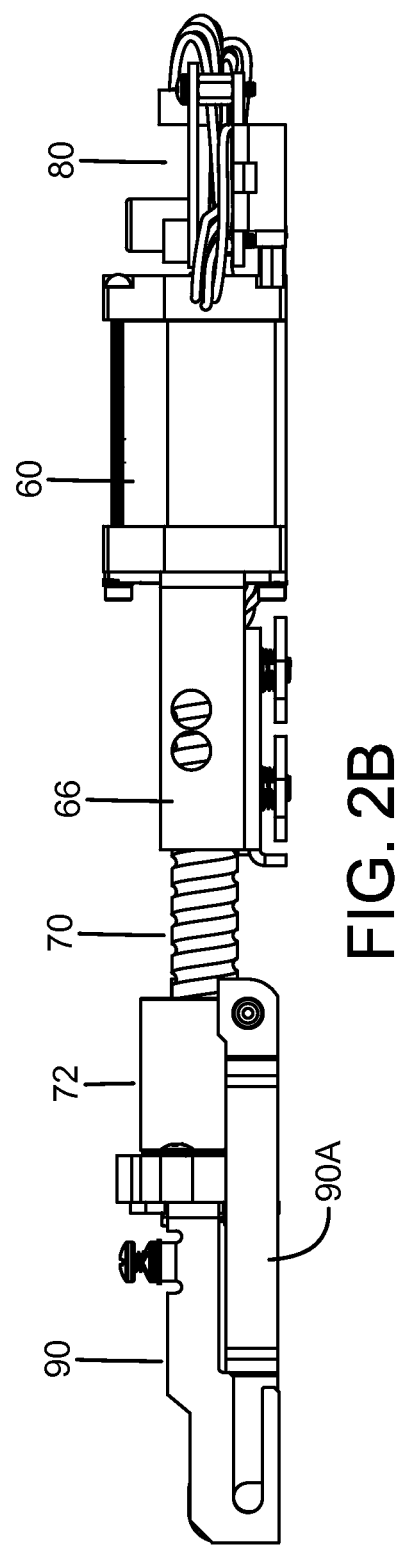
Figure 2C:
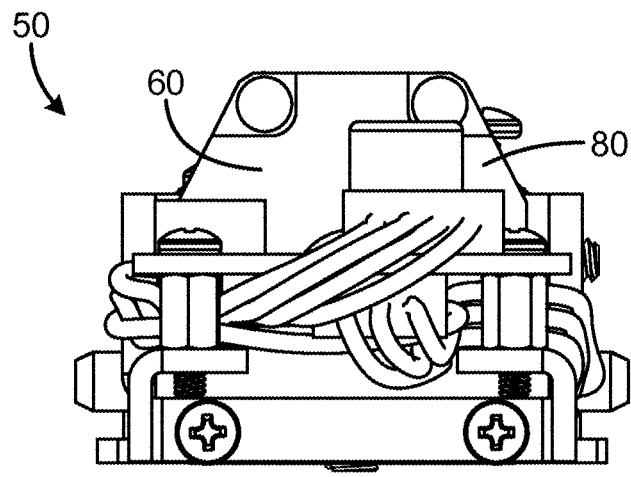
Figure 2D:
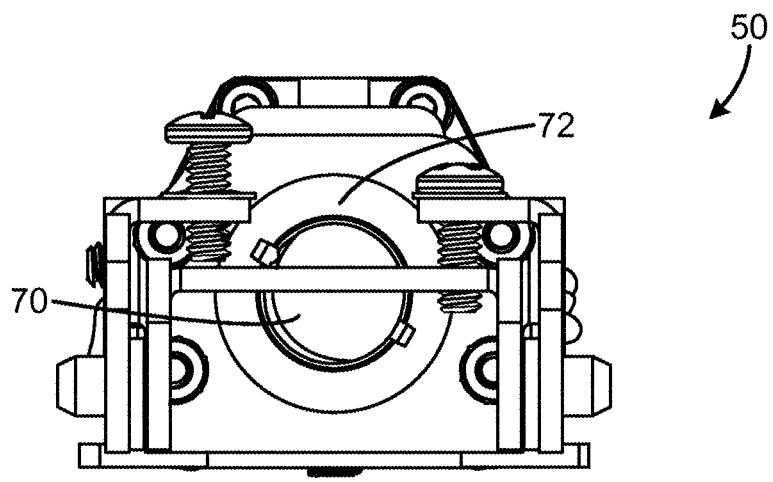

The system 50 in this exemplary embodiment incorporates a calibration system to set the rest position of the nut 72. The calibration system is described in pending U.S. application Ser. No. 14/664,513, filed Mar. 20, 2015, the entire contents of which are incorporated herein by this reference. The calibration system includes a magnet 86 mounted to the linkage 90A, and a sensor 84 mounted to the motor mount 66. Signals from the sensor 84 are communicated to the motor control module 80 by wiring 84A (FIG. 2A).

It will be seen that the ball screw 70 and nut 72 are not supported by bearings along the length of the screw, and particularly at the end of the screw distant from the motor. This simplifies the design and reduces the space requirements for system 50. The ball screw and nut are designed to be oversized for the relatively small torque requirements of a door actuator, and this size allows the screw and nut to be essentially self-supporting at the distal screw end.

Figure 2G:
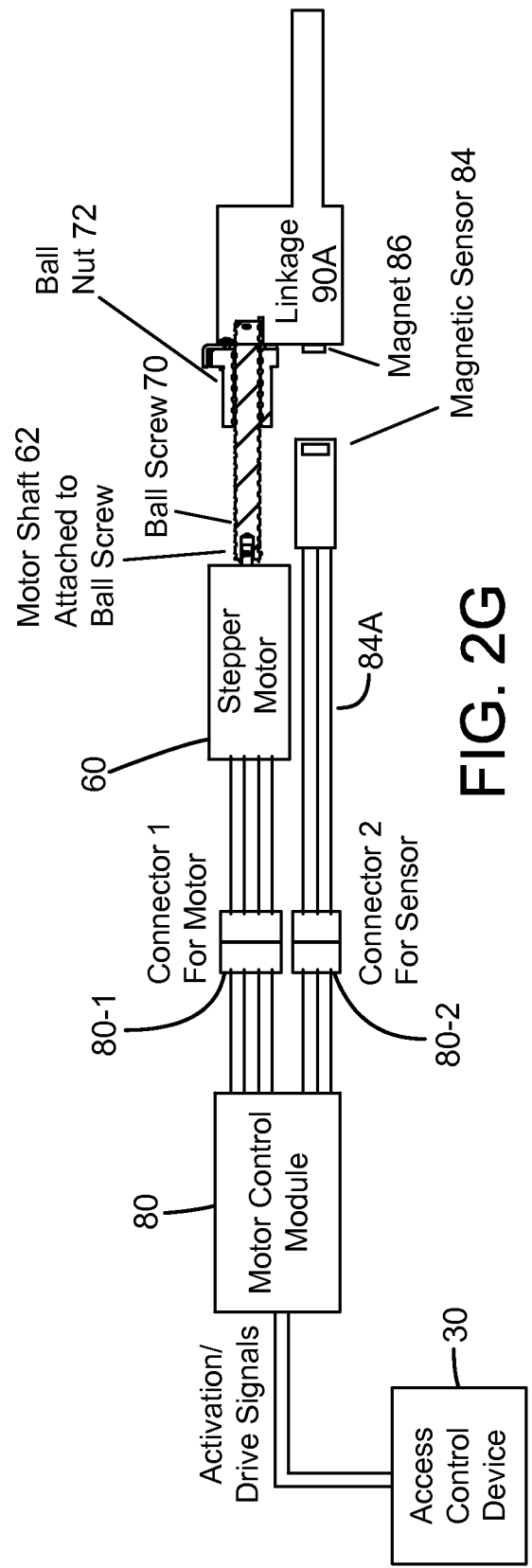
FIG. 2G is a diagrammatic block diagram illustrating an exemplary embodiment of an electronic control of the actuator system of FIG.
Figure 3A:
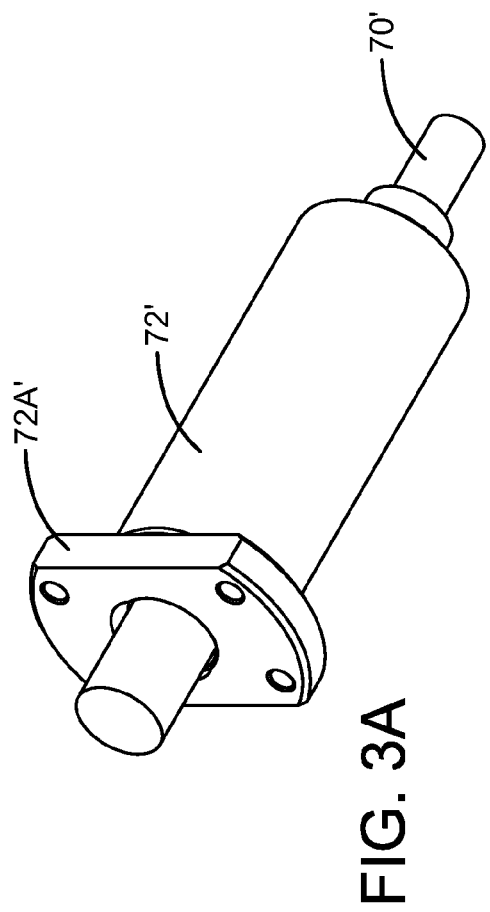
FIG. 3A is an isometric view of an alternate embodiment of a ball screw and nut which may be employed in an actuator system as in FIG. 1.
Figure 3B:
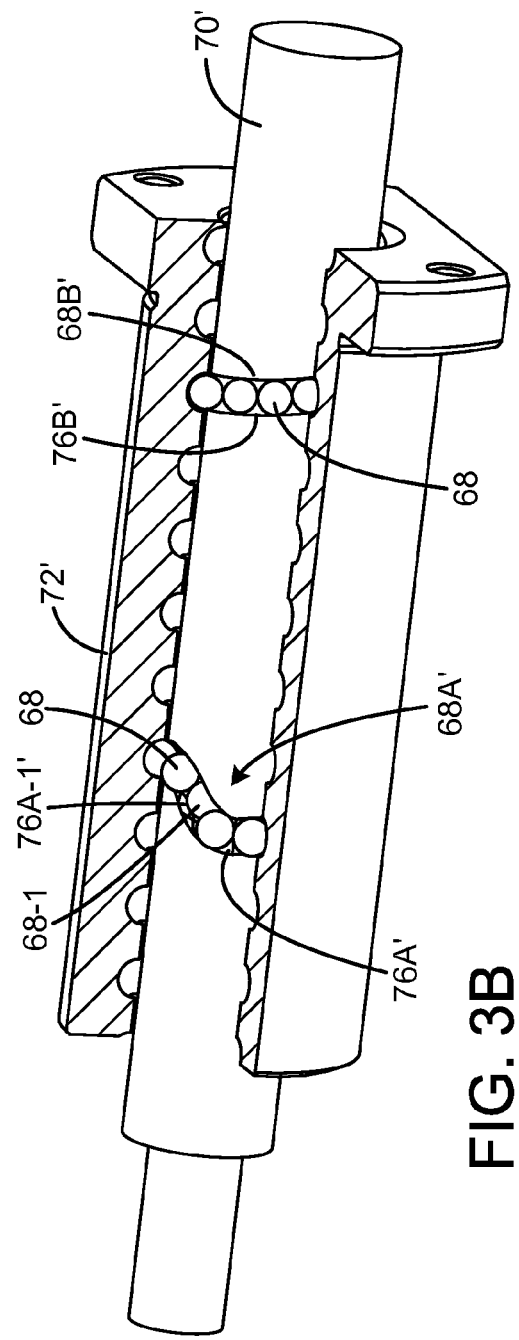
FIG. 3B is a partially broken-away isometric view of the ball screw and nut of FIG. 3A.
Figure 4D:
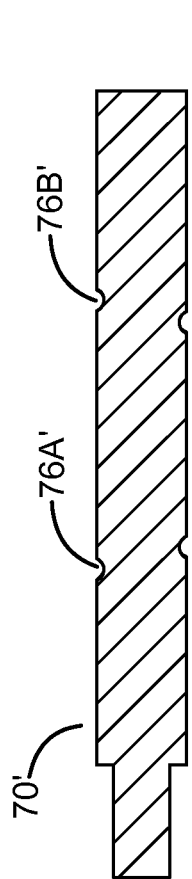
FIG. 4D is a cross-sectional view taken along line 4D-4D of FIG. 4C.
Figure 4C:
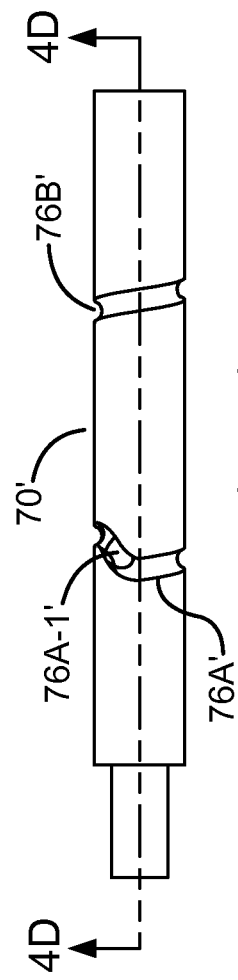
FIGS. 4B and 4C are side views of the ball screw of FIG. 4A, with the ball screw of FIG. 4C shown in a 90 degree rotated position relative to that of FIG. 4B.
Figure 4B:
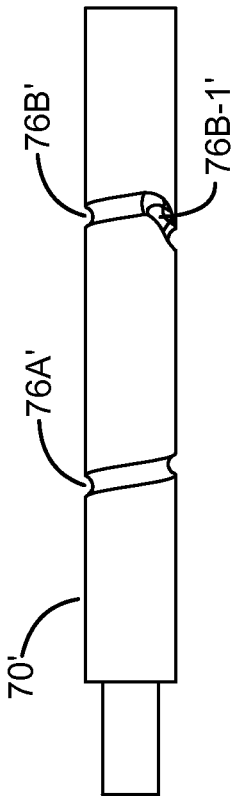
Figure 4A:
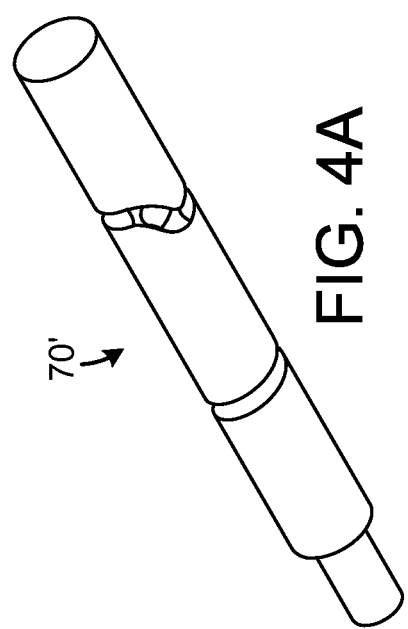
FIG. 4A is an isometric view depicting the ball screw of FIG. 3A in isolation.

FIG. 2G is a diagrammatic block diagram illustrating the electronic control of the system 50. The motor 60 is connected to the motor control module 80 by wiring and connector 80-1. The motor control module 80 is connected to a power supply for the motor, in this example, supplying 24 VDC under command of an electronic security device such as a door card key reader. The motor control module provides motor control signals and electrical power to the motor 60. In an exemplary embodiment, the motor 60 is a stepper motor, although other types of motors may be employed.

The magnet 86 is attached to an edge of the linkage 90 or nut flange 72 which faces the motor 60. The sensor 84 responsive to the magnetic field of the magnet 86 is mounted to a carrier or circuit board attached to the motor mount 66. The motor control module 80 receives the electrical signal output from the sensor 84 through wiring 84A and connector 80-2. The sensor may be a Hall Effect sensor, in one exemplary embodiment. The sensor signal will increase in magnitude as the flange 72 or linkage 90A with the magnet is brought closer to the sensor by operation of the motor or manual operation of the door opener push pad, and decrease in magnitude as the magnet is moved away.

The motor control module 80 is connected to the access control device 30 (FIG. 2G), e.g. a card reader, RFID device, biometric scanner or other input device. The access control device, upon receipt of an authorized card activation signal or other authorized activation signal, is configured to apply power to the motor control module 80 by activating the power supply to operate the motor 60 to actuate the latch bolt of the door latch mechanism to the fully retracted unlatched position.

An alternate embodiment of the ball screw drive is illustrated in FIGS. 3A-5C, and includes ball screw 70' and nut 72', with the nut including a flange 72A', and ball bearings 68. In this embodiment, there are two ball bearing circuits 68A' and 68B', which are spaced apart from each other. In this embodiment, the nut 72' is threaded, but does not include any cross-over channels between adjacent threads as in the nut 72. The ball screw 70' is unthreaded, except for grooves 76A' and 76B', which define the ball race circuits and match the nut thread pitch over a substantial portion of one revolution about the periphery of the ball screw. The ball bearings ride in the grooves, in engagement with the threading of the nut, for that portion. Each of the grooves includes a cross-over cavity 76A-1' and 76B-1' which is deep enough to allow ball bearings to drop out of engagement with the nut threading and to cross-over from one nut thread to an adjacent thread, in a recirculating manner. The ball bearings 68 are in engagement with the nut threads over a significant portion of, e.g., most of, a rotation of the screw, with the ball bearings dropping out of engagement with the nut threading as the ball bearings drop into the respective cavities and then recirculate back to the adjacent thread as the screw is turned. In an exemplary embodiment, the significant portion exceeds 300 degrees of a revolution of the ball screw. Exemplary ball bearing 68-1 is depicted in FIG. 3B in cavity 76A-1' of the ball screw 70'. The ball bearings 68 substantially fill the circuits, and may be loaded from one end of the nut as the screw is inserted into the nut 72'.

In an exemplary embodiment, the nut 72' is approximately 3 inches in length, and the spacing of the circuits 68A' and 68B' is selected to provide approximately ¾ inch of travel of the nut 72' before the circuits reach an edge of the nut 72'. Continuing to drive the screw to advance or retract the nut such that one of the circuits is exposed would allow the ball bearings to fall out. However, for some applications, the limited travel is sufficient. One exemplary application is for use in door latch actuators.

Figure 6A:
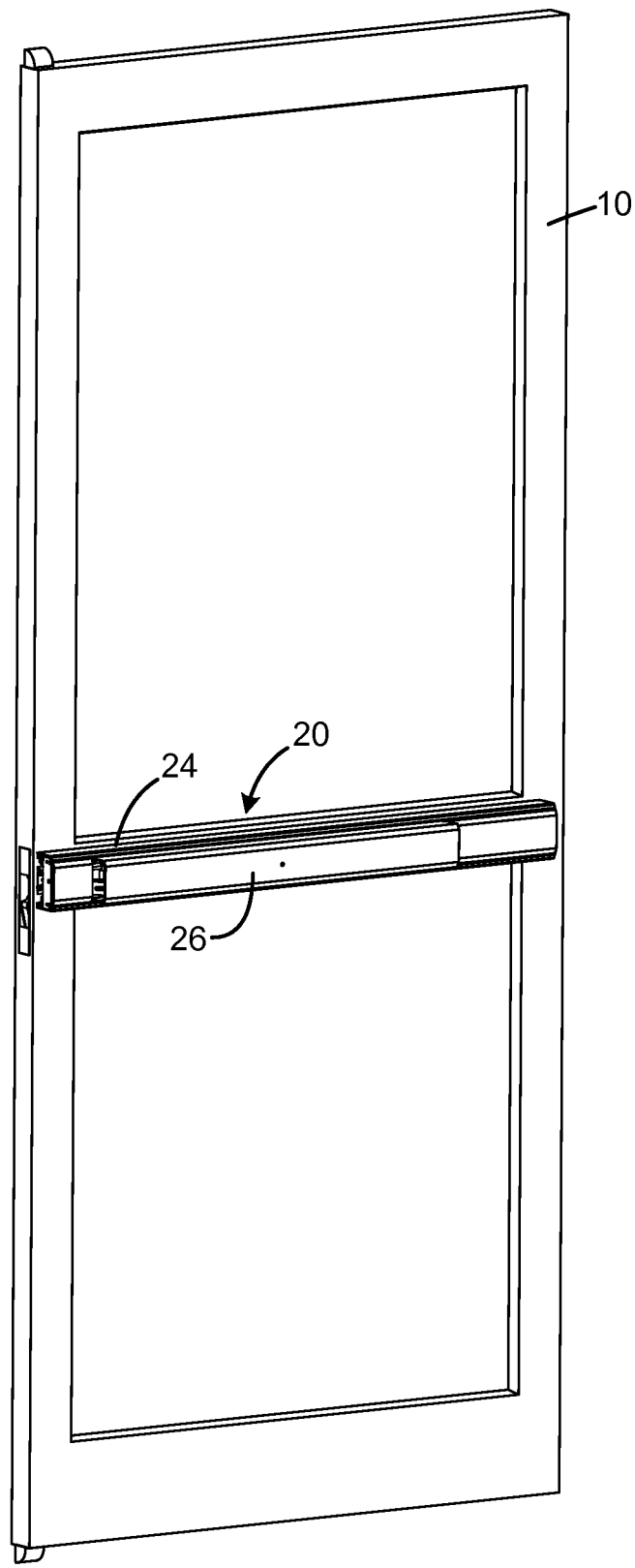
Figure 7C:
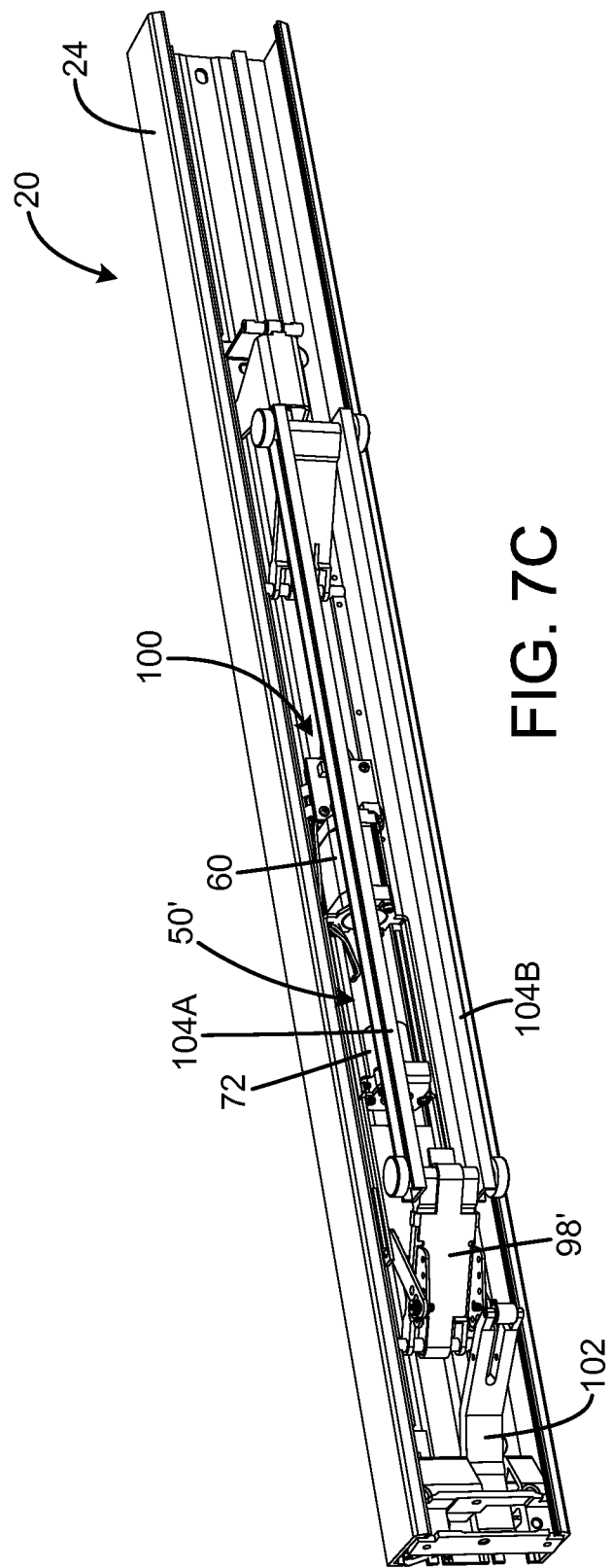

FIGS. 6A-6B illustrate an electromechanical door latch system 20, mounted to a door 10. The system 20 is mounted on the interior or egress side of door 10, and allows free egress from the inside, with some means of access control from the exterior side of the door, such as a card reader or other electronic security device to actuate the electromechanical actuator system, such as system 50 described above. The latch system 20 includes a housing structure 24, a push pad or bar structure 26, and, in this exemplary embodiment, a two-point latch mechanism including vertical rods 22A, 22B activated by the push pad structure being pushed inwardly toward the door by a person wishing to exit through the door, or by the electromechanical system activated by the access control device located on the exterior side of the building structure, e.g. on an exterior wall in which the door is mounted. The vertical rods have latch bolts 22A1, 22B1 which enter receptacles (not shown) at the top and bottom, respectively, of the door frame. The type of latch mechanism illustrated is merely exemplary; other types may alternatively be employed, such as three-point latch mechanisms, or latch bolts actuated horizontally. FIG. 6B shows the latch rods 22A, 22B in the fully extended, latch position.

FIGS. 7A-7J illustrate an exemplary door latch system 20 employing an actuator system 50' in accordance with aspects of the invention. The actuator system 50' is identical to that described above with respect to the system 50 in FIGS. 1-2G, except that the linkage 90' is adapted to a different type of door latch system. The system 50' is in the form of a kit, which may be sold separately from the manually-operated door latch system 20, or which may be integrated with a door latch system.

In this example, the linkage 90' includes a bracket structure 96A1 secured to the motor 60 at one end; the distal end of the bracket structure has a slot 96A1 therein. The linkage 90' includes an actuator linkage structure 92' attached to the flange 72A of the nut 72. The linkage structure 92' includes a pair of elongated actuator link portions 92A', 92B'. Each actuator link portion has a respective slot 92A1, 92B1 formed adjacent the linkage end thereof. The linkage 90' includes pair of pivot arms 94A' and 94B', each having a first end respectively coupled to a corresponding actuator link by a pivot slider, e.g. pivot slider 94B2 (FIG. 7A). Actuation of the motor 60 causes the nut 70 to advance or retract, pushing or pulling the pivot arms 94A', 94B'. The slots 92A1', 92B1' allow the pivot arms to move along the slot extent, when the push pad of the door latch system is pushed, without pushing on the nut 72.

The linkage 90' further includes a bracket structure 98' which is respectively attached to the pivot arms by pivot pins 98A', 98B' to sidearm portions 98C' and 98D'. The bracket structure 98' also includes a clamp portion 98E1 which is configured to clamp to the actuator mechanism 100 of the door latch system 20, as shown in FIG. 7B. The mechanism 100 may be preexisting in a manual door latch system, with the system 50' being retrofit to the system 20, or included with the system 20 as a total electromechanical latch actuator system. The system 50' provides electromechanical operation of the latch actuation system, while also retaining the manual push pad operational functionality.

The mechanism 100 includes latch actuator 102 with cradle 102A, and rails 104A, 104B, which are connected to the push pad 26. The rails are mounted for pivotal operation with links 106A, 106B, with spring biasing to hold the rails in the position shown in FIG. 7B, for example. As the push pad is pushed down by the user, the push pad will contact the roller 102B1 at the tip of rocker arm 102B, which then causes the rocker arm 102 to pivot about pivot 102C1 of bracket 102C, with tip 102B2 rotating the cradle 102A about axis 102A1 (FIG. 7J). The spring action on the rails 104A, 104B will cause the push pad to be returned to the rest, up position when force is released from the push pad by the user or by the electromechanical actuator.

The integration of the system 50' with the system 20 is further illustrated in FIGS. 7C-7J. The motor and circuit module of the system 50' are mounted to the floor of the housing 24 of the system 20, under the push pad 26. The push pad is biased to the home, up position shown in FIGS. 7D-7F by springs (not shown). The ball screw drive and bracket structure 98' is normally in a position illustrated in FIGS. 7A-7B. The nut 72 can be driven by the motor 60 toward the motor, thus pulling on the link arms 94A' and 94B', and causing the rails 104A, 104B to be pulled downwardly by contact of the bracket 98' on link 106A. This in turn pulls the push pad 26 downwardly or inwardly, to contact roller 102B1, and thus actuating the cradle 102A to release the latches.

The rest position of the push pad 26 and the corresponding positions of the elements of system 50' are illustrated in FIGS. 7F and 7G. FIGS. 7H and 7I illustrate the respective positions when the push pad has been manually pushed inwardly by a user, with the slots 92A1', 96B1', 96A1' and 96B1' allowing the mechanism 100 to operate without pushing on the nut 72.

Figure 8H:
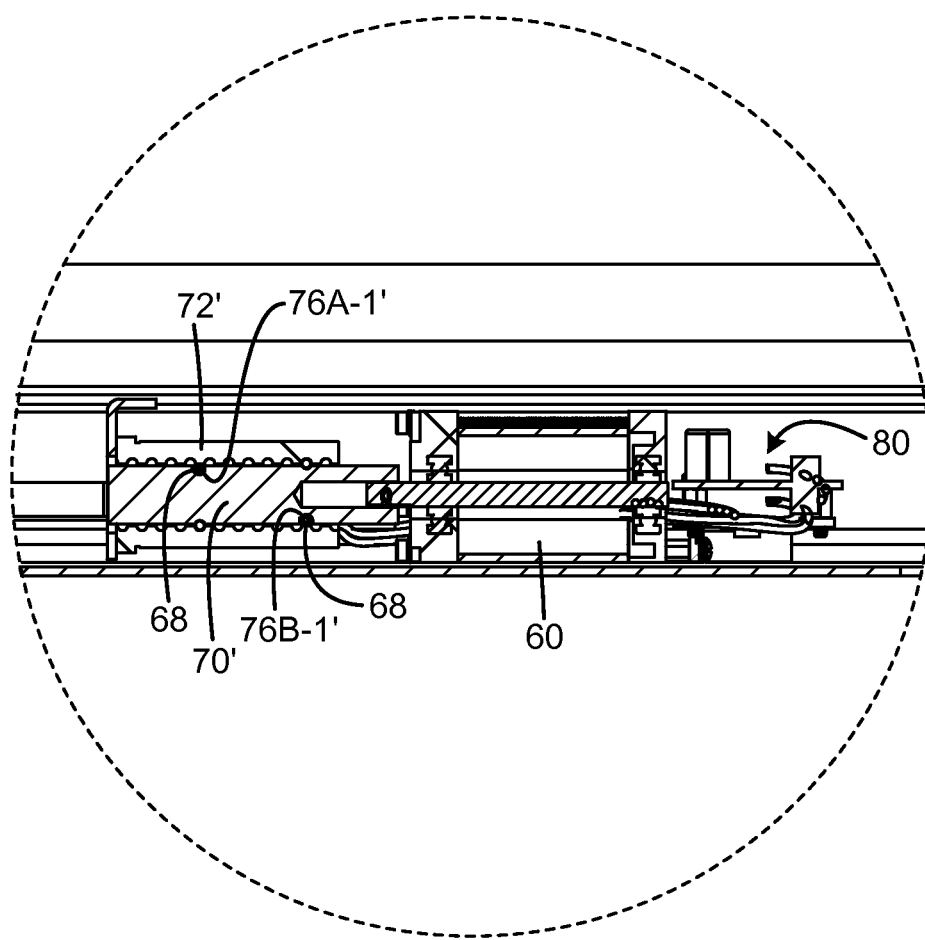
FIG. 8H is an enlargement of the portion enclosed within phantom circle 8H of FIG. 8F.

FIGS. 8A-8H illustrate an exemplary door latch system 20 like that described with respect to FIGS. 7A-7J, employing an alternate form of an actuator system 50" in accordance with aspects of the invention. The actuator system 50" is similar to system 50', except that the ball screw 70' and nut 72' are as described with respect to FIGS. 3A-5C. FIGS. 8A-8C are similar to FIGS. 7A-7C. FIG. 8D is a bottom view (from the point of view of the system 20 installed on a door) with the push pad removed, illustrating the rest positions of the rail 104B, the link 106A, the cradle 102A and the rocker arm 102B. FIG. 8E is a front view of the system 20 as in FIG. 8D. FIGS. 8F and 8G are cross-sectional views taken along lines 8F-8F and 8G-8G of FIG. 8E, depicting rest positions of the system with the push pad omitted but assumed to be at the rest, extended position. The door latch is in the door latched position. FIG. 8H shows ball bearings 68 in the ball circuit cavities 76A-1' and 76B-1' in the screw shaft 70'. The cavities are 180 degrees opposite each other.

Figure 9A:
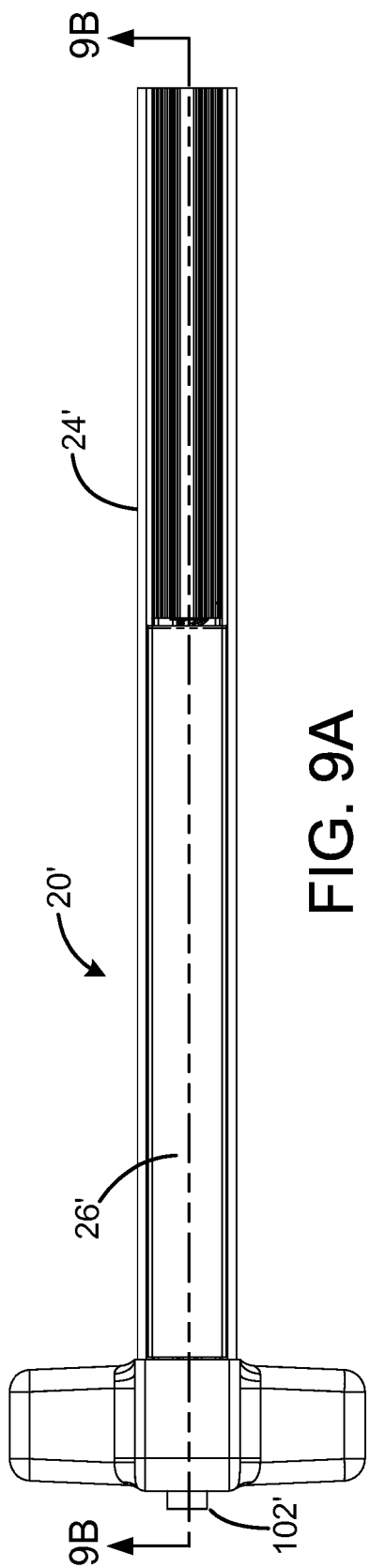
FIGS. 9A-9B illustrate another exemplary door latch system employing an actuator system in accordance with aspects of the invention.
Figure 9B:
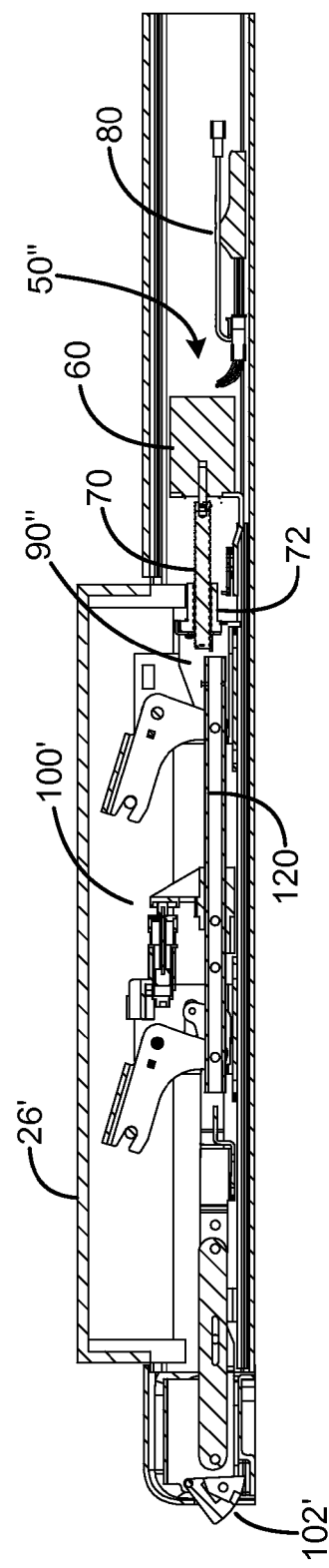

FIGS. 9A-9B illustrate a further embodiment of a door latch system 20' employing an electromechanical ball screw actuator 50"'. The latch system 20' is a system with a push bar 26', similar to the system described with respect to FIGS. 1A-4D of the '513 application. Reference is made to this co-pending application for a detailed description of the operation of the system 20'. The system 50" is as described above, with respect to FIGS. 1A-2G, with a recirculating ball drive including ball screw 70 and nut 72, except that the linkage 90" is adapted to connect to linkage 120. There is a slot (not visible) in the linkage 90" allowing the push pad to be manually pushed, without exerting force on the nut 72.

FIGS. 10A-10J illustrate yet another exemplary door latch system employing a door latch actuation system 20'" in accordance with aspects of the invention. In this example, the push pad 26" extends substantially across the length of the system 20'". The system 20'" includes an electromechanical ball screw actuator system 50 as in FIGS. 1A-2G. The actuator mechanism 100" includes respective fore and aft linkages 106A" and 106B" connected to the push pad 26", and spring-loaded to bias the push pad to the rest position shown in FIGS. 10A-10D. The electromechanical actuator system 50 is connected to the aft linkage 106B", so that by pulling on the linkage, the push pad is drawn downwardly or inwardly from the rest position. As shown in FIGS. 10A-10D, the latch bolt 102" in the rest position is fully disposed outwardly, to engage the latch feature in the door frame (not shown).

FIGS. 10E-10G and 10H-10J illustrate the respective conditions in which the latch bolt 102" is moved through an intermediate position (FIGS. 10E-10G) to the fully unlatched condition in which the latch bolt 102" is fully retracted (FIGS. 10H-10J). The latch bolt actuation can be the result of either manual operation of the push pad, or operation of the electromechanical actuator 50.

Although the foregoing has been a description and illustration of specific embodiments of the subject, various modifications and changes thereto can be made by persons skilled in the art without departing from the scope and spirit of the invention.

What is claimed is:

1. An electromechanical door latch system, comprising:
   a latch device configured for motion between a latched position and an unlatched position when installed on a door having a first side and a second side, the latched position preventing the door from opening;
   a mechanical apparatus coupled to the latch device and configured to move the latch device to the unlatched position in response to force manually applied by a user to a component of the mechanical apparatus, wherein the component of the mechanical apparatus is a push pad mounted to the first side of the door;
   an electromechanical actuator system coupled to the latch device to move the latch device to an actuator unlatched position in response to an electrical signal from an access control device, the electromechanical actuator system including a control module, a motor with a motor shaft, and a mechanism to translate the rotational output force of the motor to a force to actuate the latch device;
   wherein said mechanism comprises a ball screw drive comprising a ball screw and a threaded nut, and wherein one of the ball screw or threaded nut is configured for coupling to the latch device or mechanical apparatus and constrained from rotation, and the other of the ball screw or threaded nut is coupled to the motor shaft, and at least one recirculating ball circuits including ball bearings for transferring torque from the motor to drive the one of the ball screw and nut along an axis of the ball screw, the mechanism further including a mechanical linkage configured to couple the one of the ball screw or the threaded nut to the latch device.

2. The system of claim 1, wherein an end of the ball screw is attached to the motor shaft, and the threaded nut is constrained from rotation and is coupled to the latch device or the mechanical apparatus.

3. The system of claim 1, wherein the ball screw drive is free of bearings at a ball screw end distant from the motor to support the ball screw.

4. The system of claim 1, wherein the at least one recirculating ball circuits is configured to recirculate the ball bearings through a recirculation path external to the ball screw.

5. The system of claim 1, wherein the recirculation path is defined within the threaded nut.

6. The system of claim 1, wherein the recirculation path is defined within the ball screw.

7. The system of claim 6, wherein the at least one recirculating ball circuit comprises a first recirculating ball circuit and a second recirculating ball circuit, the first and second recirculating ball circuits spaced apart along the ball screw, and wherein the drive system is configured to provide a path of travel shorter than a longitudinal extent of the nut along the ball screw axis.

8. The system of claim 1, further comprising a push pad mechanical linkage configured to couple the push pad to the latch device without exerting turning force on the one of the ball screw or the threaded nut when the push pad is manually activated.

9. A kit for installation in a door latch system including a latch device configured for motion between a latched position and an unlatched position when installed in a door having a first side and a second side, and a mechanical apparatus coupled to the latch device and configured to move the latch device to the unlatched position in response to force manually applied by a user to a push pad component of the mechanical apparatus, the kit comprising:
   an electromechanical actuator system configured for coupling to the latch device to move the latch device to an actuator unlatched position in response to an electrical signal from an access control device, the electromechanical actuator system including a control module, a motor with a motor shaft, and a mechanism to translate the rotational output force of the motor to a force to actuate the latch device;
   wherein the mechanism comprises a ball screw drive comprising a ball screw and a threaded nut, and wherein one of the ball screw or threaded nut is configured for coupling to the latch device or to the push pad component of the mechanical apparatus and constrained from rotation, and the other of the ball screw or threaded nut is coupled to the motor shaft, and at least one recirculating ball circuits including ball bearings for transferring torque from the motor to drive the one of the ball screw and nut along an axis of the ball screw; and
   the mechanism further comprising a mechanical linkage configured to couple the one of the ball screw or the threaded nut to the latch device.

10. The kit of claim 9, wherein an end of the ball screw is attached to the motor shaft, and the threaded nut is constrained from rotation and is coupled to the latch device or the mechanical apparatus.

11. The system of claim 10, wherein the ball screw drive is free of bearings to support the ball screw.

12. The system of claim 10, wherein the at least one recirculating ball circuit is configured to recirculate the ball bearings through a recirculation path external to the ball screw.

13. The system of claim 10, wherein the recirculation path is defined within the threaded nut.

14. The system of claim 9, wherein the recirculation path is defined within the ball screw.

15. The system of claim 10, wherein the at least one recirculating ball circuit comprises a first recirculating ball circuit and a second recirculating ball circuit, the first and second recirculating ball circuits spaced apart along the ball screw.

16. The system of claim 14, wherein the at least one recirculating ball circuit comprises a first recirculating ball circuit and a second recirculating ball circuit, the first and second recirculating ball circuits spaced apart along the ball screw, and wherein the drive system is configured to provide a path of travel shorter than a longitudinal extent of the nut along the ball screw axis.

* * * * *